United States Patent
Jun et al.

(10) Patent No.: US 11,056,067 B2
(45) Date of Patent: Jul. 6, 2021

(54) DISPLAY APPARATUS AND DISPLAY SYSTEM

(71) Applicant: Samsung Display Co., Ltd., Yongin-Si (KR)

(72) Inventors: Tae-Jong Jun, Suwon-si (KR); Daeki Park, Seoul (KR); Namjae Lim, Gwacheon-si (KR); Jae Sung Bae, Suwon-si (KR); Sanghyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/701,913

(22) Filed: Dec. 3, 2019

(65) Prior Publication Data

US 2020/0226990 A1    Jul. 16, 2020

(30) Foreign Application Priority Data

Jan. 16, 2019    (KR) .................. 10-2019-0005962

(51) Int. Cl.
  *G09G 3/36*    (2006.01)
  *G09G 5/14*    (2006.01)

(52) U.S. Cl.
  CPC .......... *G09G 3/3607* (2013.01); *G09G 3/3688* (2013.01); *G09G 5/14* (2013.01);
  (Continued)

(58) Field of Classification Search
  CPC ...... G09G 3/3607; G09G 3/3688; G09G 5/14; G09G 2300/026; G09G 2300/0439; G09G 2310/0232; G09G 2310/08; G09G 2320/0233; G09G 2320/0673; G09G 2320/0271; G09G 2320/0285;
  (Continued)

(56) References Cited

U.S. PATENT DOCUMENTS 5,068,740 A  * 11/1991  Brody .................. G06F 3/147
                                                    348/383
2003/0156086 A1* 8/2003  Maeda .................. G06F 3/14
                                                    345/89

(Continued)

FOREIGN PATENT DOCUMENTS

JP    2009192963 A    8/2009
KR    1020150041459 A    4/2015

(Continued)

OTHER PUBLICATIONS

Extended European Search Report for Application No. 20151911.3-1210 dated Mar. 13, 2020, citing the above reference(s).

*Primary Examiner* — Jose R Soto Lopez
(74) *Attorney, Agent, or Firm* — Cantor Colburn LLP

(57) ABSTRACT

A display apparatus includes a display panel including a plurality of pixels, and a driver which receives input image data, divides a border portion of the display panel into edge regions and corner regions, generates final image data by compensating the input image data such that luminances of the edge regions are increased by a first multiplicative factor and luminances of the corner regions are increased by a second multiplicative factor greater than the first multiplicative factor, and drives the display panel based on the final image data.

20 Claims, 16 Drawing Sheets

(52) U.S. Cl.
CPC ............. *G09G 2300/026* (2013.01); *G09G 2300/0439* (2013.01); *G09G 2310/0232* (2013.01); *G09G 2310/08* (2013.01); *G09G 2320/0233* (2013.01); *G09G 2320/0673* (2013.01)

(58) Field of Classification Search
CPC .... G09G 2360/16; G09G 3/3648; G09G 3/36; G09G 3/3208; G06F 3/1446
See application file for complete search history.

(56) References Cited

U.S. PATENT DOCUMENTS

| | | | | |
|---|---|---|---|---|
| 2005/0093798 | A1* | 5/2005 | Kamada | G09G 3/20 345/89 |
| 2009/0085485 | A1* | 4/2009 | Young | G09G 3/3406 315/155 |
| 2009/0167957 | A1* | 7/2009 | Joo | G06T 5/008 348/687 |
| 2010/0207955 | A1* | 8/2010 | Nishimaki | G09G 3/2007 345/589 |
| 2011/0148910 | A1* | 6/2011 | Botzas | G09G 5/02 345/600 |
| 2011/0285758 | A1* | 11/2011 | Matsushita | G09G 5/10 345/690 |
| 2013/0107060 | A1* | 5/2013 | Wei | G09G 3/36 348/191 |
| 2013/0265323 | A1* | 10/2013 | Morikawa | G09G 3/3611 345/601 |
| 2013/0321497 | A1* | 12/2013 | Kang | G09G 3/3648 345/694 |
| 2014/0009484 | A1* | 1/2014 | Suyama | G06T 11/001 345/589 |
| 2014/0125711 | A1* | 5/2014 | Onishi | G09G 3/3406 345/690 |
| 2014/0218386 | A1* | 8/2014 | Tatsuno | G09G 3/3648 345/590 |
| 2014/0354699 | A1* | 12/2014 | Shin | G09G 3/2022 345/690 |
| 2015/0009249 | A1* | 1/2015 | Kudo | H04N 5/66 345/691 |
| 2015/0077429 | A1* | 3/2015 | Eguchi | G09G 3/3426 345/589 |
| 2015/0091953 | A1* | 4/2015 | Wu | G09G 3/2007 345/690 |
| 2015/0145894 | A1* | 5/2015 | Kim | G09G 3/3607 345/690 |
| 2015/0154912 | A1* | 6/2015 | Hong | G09G 3/3225 345/211 |
| 2016/0330456 | A1* | 11/2016 | Lasserre | G06T 1/0007 |
| 2016/0335958 | A1* | 11/2016 | Huang | G02B 6/0055 |
| 2017/0084232 | A1* | 3/2017 | Yang | G09G 3/3406 |
| 2017/0110065 | A1* | 4/2017 | Zhang | G09G 3/2018 |
| 2017/0257608 | A1* | 9/2017 | Ikeda | G06T 11/60 |
| 2018/0047141 | A1* | 2/2018 | El Mezeni | G06T 3/40 |
| 2018/0047345 | A1* | 2/2018 | Dunn | G02F 1/133603 |
| 2018/0090049 | A1* | 3/2018 | Kim | G09G 3/3666 |
| 2018/0113241 | A1* | 4/2018 | Powell | G06F 1/1626 |
| 2018/0114474 | A1* | 4/2018 | Powell | G02F 1/133526 |
| 2018/0130425 | A1* | 5/2018 | Choi | G02F 1/13336 |
| 2018/0225075 | A1* | 8/2018 | Park | G09G 3/3233 |
| 2018/0342189 | A1* | 11/2018 | Xu | G09G 3/2003 |
| 2018/0374426 | A1* | 12/2018 | Chen | G09G 5/10 |
| 2019/0019474 | A1 | 1/2019 | Jun et al. | |
| 2019/0051230 | A1* | 2/2019 | Jeon | H01L 27/3213 |
| 2019/0073962 | A1* | 3/2019 | Aflatooni | G09G 3/3275 |
| 2019/0385544 | A1* | 12/2019 | Tan | G09G 5/10 |
| 2020/0074941 | A1* | 3/2020 | Takahashi | G09G 3/3406 |
| 2020/0202801 | A1* | 6/2020 | Lee | G09G 3/3406 |
| 2020/0241828 | A1* | 7/2020 | Noyelle | G06F 3/1446 |
| 2020/0294469 | A1* | 9/2020 | Kim | G09G 5/00 |
| 2020/0327840 | A1* | 10/2020 | Kobayashi | H04N 9/30 |

FOREIGN PATENT DOCUMENTS

| | | |
|---|---|---|
| KR | 1020170026878 A | 3/2017 |
| KR | 1020170131806 A | 11/2017 |

\* cited by examiner

| Model | BZW | P_BZW(As-Is) | P_BZW | P_BZW(Ideal) |
|---|---|---|---|---|
| A | 2.30mm | 3.28mm | 2.76mm | 2.33mm |
| B | 1.49mm | 2.68mm | 1.95mm | 1.48mm |

# DISPLAY APPARATUS AND DISPLAY SYSTEM

This application claims priority to Korean Patent Application No. 10-2019-0005962, filed on Jan. 16, 2019, and all the benefits accruing therefrom under 35 U.S.C. § 119, the content of which in its entirety is herein incorporated by reference.

BACKGROUND

1. Field

Exemplary embodiments of the invention relate to a display apparatus, and more particularly to a display apparatus and a display system including the display apparatus.

2. Description of the Related Art

A display apparatus, such as a liquid crystal display ("LCD") apparatus and an organic light emitting display apparatus, includes a display panel and a panel driver which drives the display panel. The display panel includes a plurality of gate lines, a plurality of data lines and a plurality of pixels connected to the gate lines and the data lines. The panel driver includes a gate driver providing gate signals to the gate lines and a data driver providing data voltages to the data lines.

In general, the LCD apparatus includes a first substrate including a pixel electrode, a second substrate including a common electrode and a liquid crystal layer disposed between the first and second substrates. An electric field is generated by voltages applied to the pixel electrode and the common electrode. By adjusting an intensity of the electric field, a transmittance of light passing through the liquid crystal layer may be adjusted such that a desired image may be displayed.

The organic light emitting display apparatus displays images using organic light emitting diodes ("OLEDs"). The OLED generally includes an organic layer between two electrodes, i.e., an anode and a cathode. Holes from the anode may be combined with electrons from the cathode in the organic layer between the anode and the cathode to emit light.

A tiled display apparatus is used as a substantially large display apparatus by integrating a plurality of display apparatuses for displaying an ultra-high resolution image. The tiled display apparatus includes bezels disposed between the plurality of display apparatuses.

SUMMARY

Some exemplary embodiments provide a display apparatus capable of improving display quality.

Some exemplary embodiments provide a display system including the display apparatus.

An exemplary embodiment provides a display apparatus including a display panel including a plurality of pixels, and a driver which receives input image data, divides a border portion of the display panel into edge regions and corner regions, generates final image data by compensating the input image data such that luminances of the edge regions are increased by a first multiplicative factor and luminances of the corner regions are increased by a second multiplicative factor greater than the first multiplicative factor, and drives the display panel based on the final image data.

In exemplary embodiments, the driver may include a compensation constant storage which stores edge compensation constants for pixels disposed in the edge regions among the plurality of pixels, and corner compensation constants for pixels disposed in the corner regions among the plurality of pixels.

In exemplary embodiments, the corner compensation constants may be greater than the edge compensation constants.

In exemplary embodiments, the edge compensation constants for each of the edge regions may gradually increase along a first direction toward a bezel, and are constant along a second direction perpendicular to the first direction, and the corner compensation constants for each of the corner regions may gradually increase along the first direction, and may gradually increase along the second direction.

In exemplary embodiments, the compensation constant storage may include an edge compensation constant storage including a one-dimensional lookup table which stores the edge compensation constants gradually increasing along a first direction toward a bezel with respect to each of the edge regions, and a corner compensation constant storage including a two-dimensional lookup table which stores the corner compensation constants gradually increasing along the first direction and along a second direction perpendicular to the first direction with respect to each of the corner regions.

In exemplary embodiments, the driver may generate the final image data by compensating the input image data for the pixels disposed in the edge regions with the edge compensation constants and by compensating the input image data for the pixels disposed in the corner regions with the corner compensation constants.

In exemplary embodiments, with respect to a pixel in an edge region of the edge regions or a corner region of the corner regions among the pixels, the driver may generate the final image data for the pixel by compensating the input image data for the pixel by an equation "RGBout=RGB*{$(1+W)^{(1/\gamma)}$}", where RGBout represents the final image data for the pixel, RGB represents the input image data for the pixel, W represents an edge compensation constant of the edge compensation constants with respect to the pixel in the edge region or a corner compensation constant of the corner compensation constants with respect to the pixel in the corner region, and $\gamma$ represents a gamma value of the display apparatus.

In exemplary embodiments, with respect to a pixel in a center portion surrounded by the border portion of the display panel among the plurality of pixels, the driver may generate the final image data for the pixel a same as the input image data for the pixel.

In exemplary embodiments, each of the plurality of pixels may include a plurality of sub-pixels, and an edge compensation constant of the edge compensation constants or a corner compensation constant of the corner compensation constants may be commonly applied to sub-pixels of the plurality of sub-pixels included in a pixel of the pixels in the edge regions or the corner regions.

In exemplary embodiments, each of the plurality of pixels may include a plurality of sub-pixels, and different edge compensation constants or different corner compensation constants may be applied to sub-pixels of the plurality of sub-pixels included in a pixel of the pixels in the edge regions or the corner regions.

In exemplary embodiments, the edge compensation constants and the corner compensation constants may be determined based on a target luminance that is constant with respect to the plurality of pixels and real luminances that are changed depending on positions of the plurality of pixels.

In exemplary embodiments, an edge compensation constant of the edge compensation constants or a corner compensation constant of the corner compensation constants for a pixel in an edge region of the edge regions or a corner region of the corner regions among the pixels may be determined by an equation "W=Lt/Lr−1", where W represents the edge compensation constant or the corner compensation constant for the pixel, Lt represents a target luminance of the pixel, and Lr represents a real luminance of the pixel.

In exemplary embodiments, the display apparatus may be attached to at least one other display apparatus, and at least one of the edge regions may be adjacent to a bezel between the display panel of the display apparatus and a display panel of the at least one other display apparatus.

In exemplary embodiments, the display apparatus may be detachably attached to at least one other display apparatus.

An exemplary embodiment provides a display system including a plurality of partial display apparatuses arranged in a tile shape, and a host processor which divides source image data into a plurality of partial input image data respectively corresponding to the plurality of partial display apparatuses, and provides the plurality of partial input image data to the plurality of partial display apparatuses, respectively. Each of the plurality of partial display apparatuses includes a partial display panel including a plurality of pixels, and a driver which receives corresponding partial input image data among the plurality of partial input image data, divides a border portion of the partial display panel into edge regions and corner regions, generates partial final image data by compensating the corresponding partial input image data such that luminances of the edge regions are increased by a first multiplicative factor and luminances of the corner regions are increased by a second multiplicative factor greater than the first multiplicative factor, and drives the partial display panel based on the partial final image data.

In exemplary embodiments, the driver may include a compensation constant storage which stores edge compensation constants for pixels disposed in the edge regions among the plurality of pixels, and corner compensation constants for pixels disposed in the corner regions among the plurality of pixels, and the corner compensation constants may be greater than the edge compensation constants.

In exemplary embodiments, the compensation constant storage may include an edge compensation constant storage including a one-dimensional lookup table which stores the edge compensation constants gradually increasing along a first direction toward a bezel with respect to each of the edge regions, and a corner compensation constant storage including a two-dimensional lookup table which stores the corner compensation constants gradually increasing along the first direction and along a second direction perpendicular to the first direction with respect to each of the corner regions.

An exemplary embodiment provides a display system including a plurality of partial display apparatuses arranged in a tile shape, and a host processor which divides source image data into a plurality of partial input image data respectively corresponding to the plurality of partial display apparatuses, divides a border portion of a partial display panel of each of the plurality of partial display apparatuses into edge regions and corner regions, generates a plurality of partial final image data by respectively compensating the plurality of partial input image data such that luminances of the edge regions are increased by a first multiplicative factor and luminances of the corner regions are increased by a second multiplicative factor greater than the first multiplicative factor, and provides the plurality of partial final image data to the plurality of partial display apparatuses, respectively.

In exemplary embodiments, the host processor may include, with respect to each of the plurality of partial display apparatuses, a compensation constant storage which stores edge compensation constants for pixels disposed in the edge regions among a plurality of pixels of the each of the plurality of partial display apparatuses, and corner compensation constants for pixels disposed in the corner regions among the plurality of pixels, and the corner compensation constants may be greater than the edge compensation constants.

In exemplary embodiments, the compensation constant storage may include an edge compensation constant storage including a one-dimensional lookup table which stores the edge compensation constants gradually increasing along a first direction toward a bezel with respect to each of the edge regions, and a corner compensation constant storage including a two-dimensional lookup table which stores the corner compensation constants gradually increasing along the first direction and along a second direction perpendicular to the first direction with respect to each of the corner regions.

As described above, a display apparatus and a display system in exemplary embodiments may improve a phenomenon of luminance decrease in a border portion of a display panel by compensating image data, considering a decreasing ratio of luminance of the border portion of the display panel. Further, the border portion of the display panel may be divided into edge regions and corner regions, and the image data may be compensated such that luminances of the edge regions may be increased by a first multiplicative factor and luminances of the corner regions may be increased by a second multiplicative factor greater than the first multiplicative factor. Accordingly, the image quality of the display apparatus may be further improved.

BRIEF DESCRIPTION OF THE DRAWINGS

Illustrative, non-limiting exemplary embodiments will be more clearly understood from the following detailed description in conjunction with the accompanying drawings.

DETAILED DESCRIPTION

Figure 1:
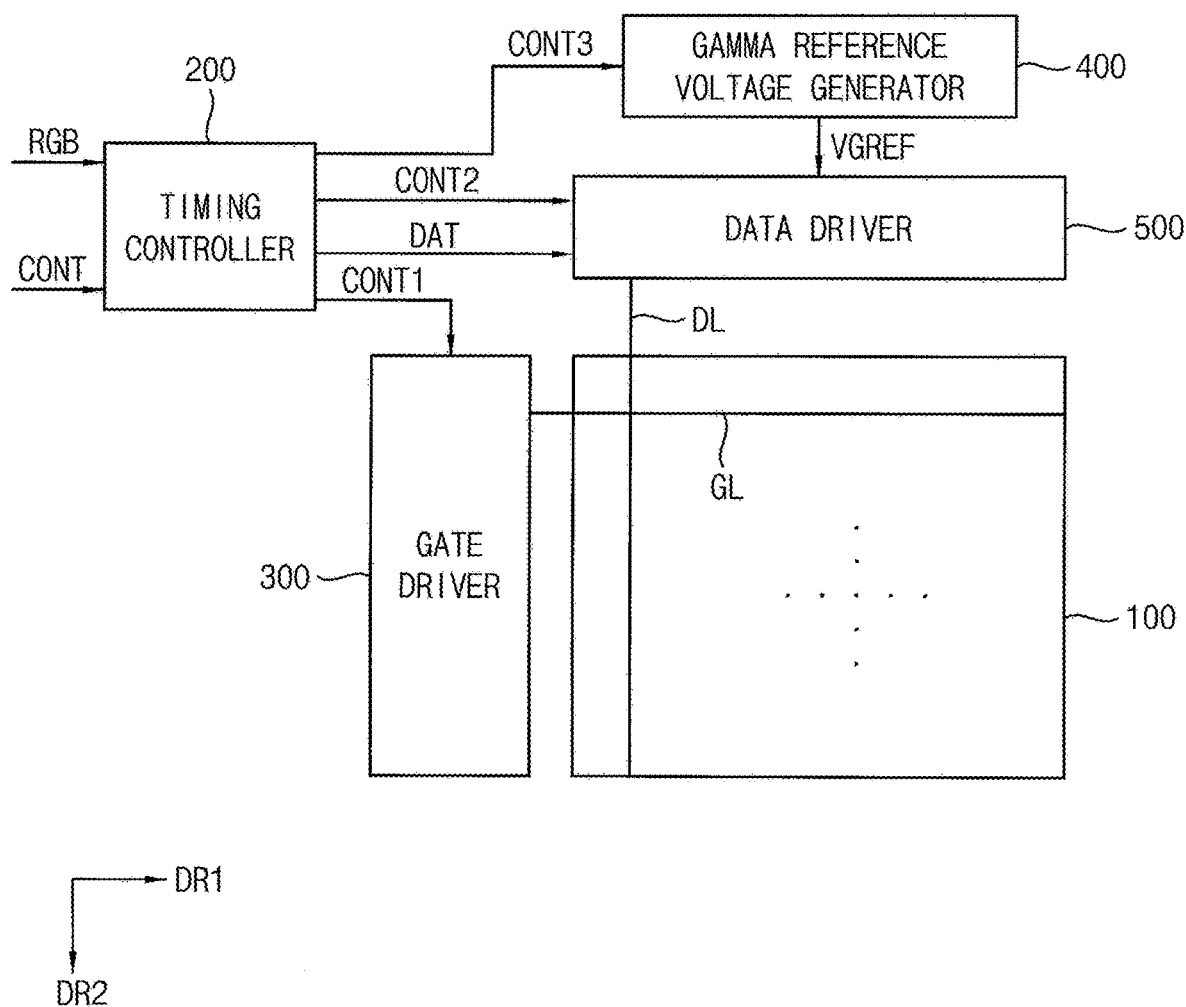
FIG. 1 is a block diagram illustrating an exemplary embodiment of a display apparatus.

Hereinafter, embodiments of the invention will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram illustrating an exemplary embodiment of a display apparatus.

Referring to FIG. 1, a display apparatus may include a display panel 100 and a driver. The driver may include a timing controller 200, a gate driver 300, a gamma reference voltage generator 400, and a data driver 500.

The display panel 100 may include a display area that displays an image and a peripheral area disposed adjacent to the display area.

The display panel 100 may include a plurality of gate lines GL, a plurality of data lines DL, and a plurality of pixels electrically coupled to the gate lines GL and the data lines DL. The gate lines GL may extend in a first direction DR1, and the data lines DL may extend in a second direction DR2 crossing the first direction DR1.

In some exemplary embodiments, each pixel may include a switching element (not shown), a liquid crystal capacitor (not shown) and a storage capacitor (not shown). The liquid crystal capacitor and the storage capacitor may be electrically connected to the switching element. In other exemplary embodiments, each pixel may include at least one capacitor and at least two transistors. In some exemplary embodiments, the pixels may be arranged in a matrix configuration, but the arrangement of the pixels may not be limited to the matrix configuration. In an exemplary embodiment, the pixels (or sub-pixels) may be arranged in various other shapes such as a diamond shape.

Each of the pixels may include a plurality of sub-pixels. In some exemplary embodiments, each pixel may have a RGB pixel structure including a red sub-pixel, a green sub-pixel and a blue sub-pixel, but the structure of each pixel may not be limited to the RGB pixel structure. In other exemplary embodiments, each pixel may have a RGBG pixel structure including a red sub-pixel, a first green sub-pixel, a blue sub-pixel and a second green sub-pixel, for example. In still other exemplary embodiments, in addition to the red, green and blue sub-pixels, or instead of the red, green and blue sub-pixels, each pixel may include a yellow sub-pixel, a cyan sub-pixel, a magenta sub-pixel, or the like.

In some exemplary embodiments, the pixels disposed in a border portion of a display panel or a display area may include a white sub-pixel.

The structure of the pixels will be explained in detail with reference to FIGS. 3 and 9.

The timing controller 200 may receive input image data RGB and an input control signal CONT from an external device (e.g., a host processor). The input image data RGB may be also referred to as an input image signal. The input image data RGB may include red image data, green image data and blue image data or may be one of the red image data, the green image data and the blue image data depending on a scope of target pixel. In some exemplary embodiments, each of the red image data, green image data, and the blue image data may represent a gray level from 0 to 255, or have a value of 0 to 255 grayscale. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and a data signal DAT based on the input image data RGB and the input control signal CONT.

The timing controller 200 may generate the first control signal CONT1 for controlling operations of the gate driver 300 based on the input control signal CONT, and may output the first control signal CONT1 to the gate driver 300. The first control signal CONT1 may include a vertical start signal and a gate clock signal.

The timing controller 200 may generate the second control signal CONT2 for controlling operations of the data driver 500 based on the input control signal CONT, and may output the second control signal CONT2 to the data driver 500. The second control signal CONT2 may include a horizontal start signal and a load signal.

The timing controller 200 may generate the data signal DAT based on the input image data RGB. The timing controller 200 may output the data signal DAT to the data driver 500. The data signal DAT may be substantially the same image data as the input image data RGB or the data signal DAT may be compensated image data generated by compensating the input image data RGB. In an exemplary embodiment, for example, the timing controller 200 may selectively perform an image quality compensation, a spot compensation, an adaptive color correction ("ACC"), and/or a dynamic capacitance compensation ("DCC") on the input image data RGB to generate the data signal DAT.

Specially, the timing controller 200 may compensate the input image data RGB in order to compensate a luminance decrease in the border portion of the screen (or in order to increase luminances of the pixels disposed in the border portion of the display area of the display panel 100). In this case, the timing controller 200 may generate the data signal DAT based on the compensated input image data.

The compensation of the input image data RGB will be explained in detail with reference to FIGS. 3 through 6, 9, and 10 through 14.

The timing controller 200 may generate the third control signal CONT3 for controlling operations of the gamma reference voltage generator 400 based on the input control signal CONT, and may output the third control signal CONT3 to the gamma reference voltage generator 400.

The gate driver 300 may generate gate signals for driving the gate lines GL in response to the first control signal CONT1 received from the timing controller 200. The gate driver 300 may sequentially output the gate signals to the gate lines GL.

In some exemplary embodiments, the gate driver 300 may be directly disposed (e.g., mounted) on the display panel 100, or may be connected to the display panel 100 as a tape carrier package ("TCP") type. In an alternative exemplary embodiment, the gate driver 300 may be integrated on the peripheral area of the display panel 100.

The gamma reference voltage generator 400 may generate a gamma reference voltage VGREF in response to the third control signal CONT3 received from the timing controller 200. The gamma reference voltage generator 400 may output the gamma reference voltage VGREF to the data driver 500. The level of the gamma reference voltage VGREF corresponds to grayscales of a plurality of pixel data included in the data signal DAT.

In some exemplary embodiments, the gamma reference voltage generator 400 may be disposed in the timing controller 200, or may be disposed in the data driver 500.

The data driver 500 may receive the second control signal CONT2 and the data signal DAT from the timing controller 200, and may receive the gamma reference voltage VGREF from the gamma reference voltage generator 400. The data driver 500 may convert the data signal DAT to data voltages having analogue levels based on the gamma reference voltage VGREF. The data driver 500 may output the data voltages to the data lines DL.

In some exemplary embodiments, the data driver 500 may be directly disposed (e.g., mounted) on the display panel 100, or may be connected to the display panel 100 as the TCP type. In an alternative exemplary embodiment, the data driver 500 may be integrated on the peripheral area of the display panel 100.

Figure 2:
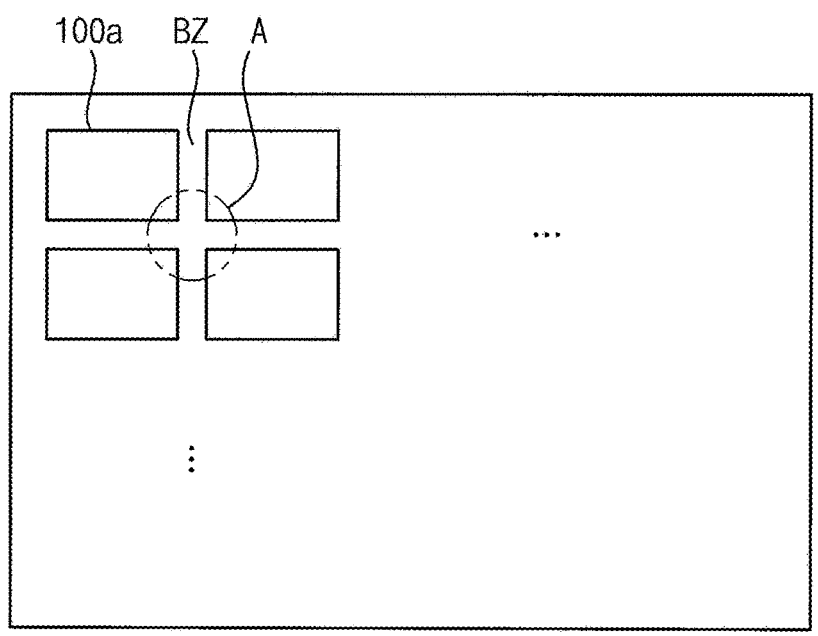
FIG. 2 is a diagram illustrating an exemplary embodiment of a screen of a tiled-display apparatus formed with a plurality of (partial) display apparatuses.

FIG. 2 is a diagram illustrating an exemplary embodiment of a screen of a tiled-display apparatus formed with a plurality of (partial) display apparatuses. The tiled display apparatus may be a substantially large display apparatus as which the plurality of (partial) display apparatuses is integrated in order to display ultra-high resolution image.

Referring to FIGS. 1 and 2, the display apparatus of FIG. 1 may be one of the plurality of (partial) display apparatuses that may be included in the tiled display apparatus in an exemplary embodiment. In this case, the display panel 100 included in the display apparatus in an exemplary embodiment may correspond to one of a plurality of partial screens included in a screen of the tiled display apparatus. That is, the display panel 100 may be one of partial display panels 100a of the tiled display apparatus.

A bezel BZ may be disposed between the partial display panels 100a of the tiled display apparatus. The user may perceive an entire screen of the tiled display apparatus as one display apparatus. Thus, the image quality of the tiled display apparatus may improve as the bezel BZ is thinner.

Figure 3:
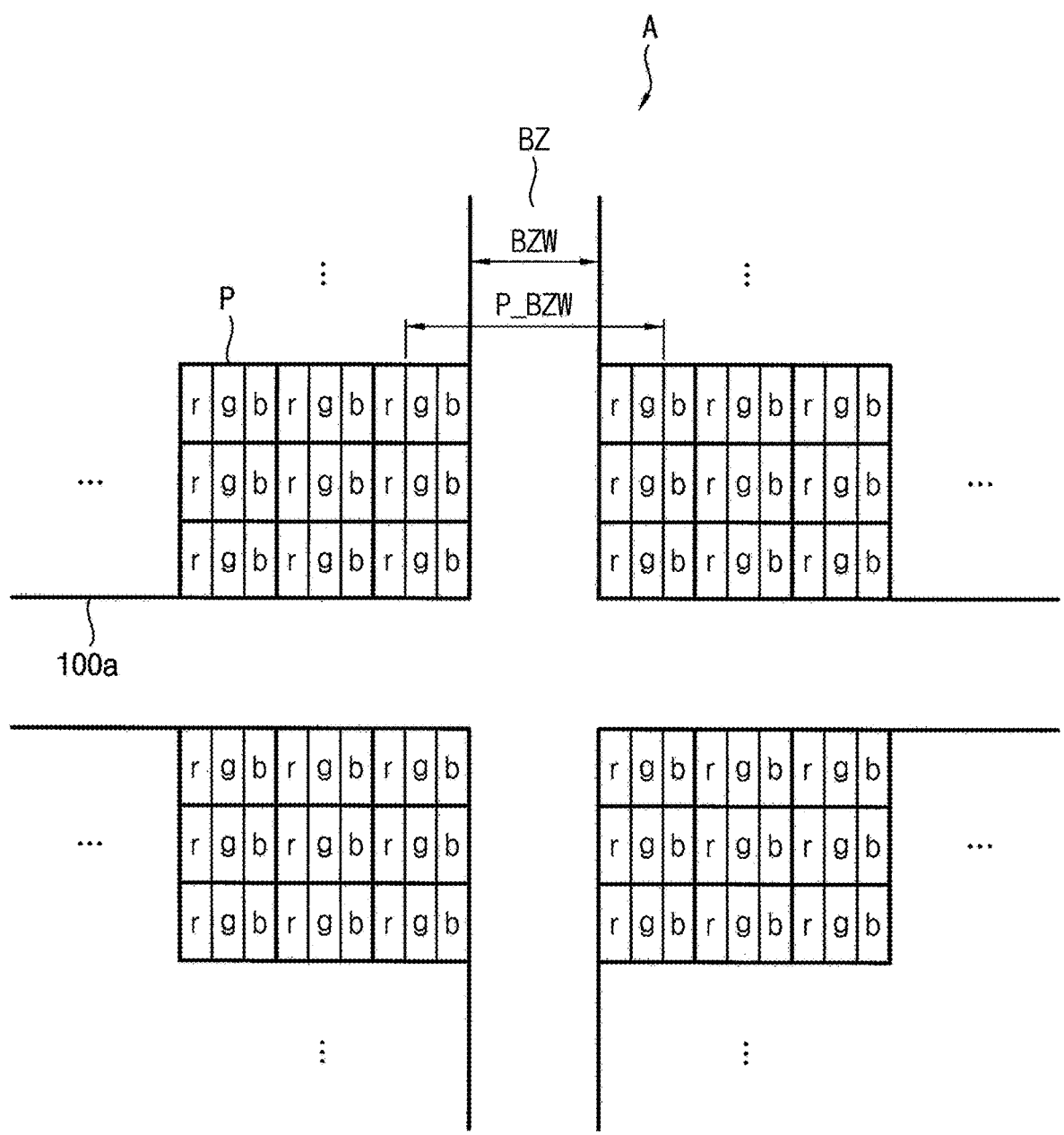
FIG. 3 is an enlarged diagram illustrating portion A of FIG. 2.

FIG. 3 is an enlarged diagram illustrating portion A of FIG. 2.

Referring to FIGS. 1 through 3, the partial display panel 100a may include a plurality of pixels. Each pixel P may include a plurality of sub-pixels. In an exemplary embodiment, each pixel P may include a red sub-pixel r, a green sub-pixel g, and a blue sub-pixel b, for example.

The other partial display panels included in the tiled display apparatus may be substantially the same as the partial display panel 100a of FIG. 3.

The bezel BZ may be a space between the partial display panels 100a. The pixels may not be disposed in the bezel BZ. That is, the image may not be displayed on the bezel BZ.

A bezel width BZW may be a real width of the bezel BZ. The bezel width BZW may be a fixed value and may not be changed once the tiled display apparatus is manufactured.

A perception bezel width P_BZW may be a width of a space that the user perceives as the bezel BZ. The perception bezel width P_BZW may increase as a border portion of the partial display panels 100a of the tiled display apparatus are darker. In most cases, the perception bezel width P_BZW may be wider than the bezel width BZW. In an exemplary embodiment, the pixels disposed in a center portion of a display area of each partial display panel 100a may receive light from backlight sources in four directions (i.e., in upward, downward, leftward and rightward directions), for example, but the pixels disposed in the border portion surrounding the center portion within the display area of each partial display panel 100a may not receive the light from the backlight sources in at least one of the four directions. Thus, the pixels disposed in the border portion may have luminances lower than those of the pixels disposed in the center portion. Accordingly, the border portion of the display area of each partial display panel 100a may be darker than the center portion of the display area of each partial display panel 100a, and thus the perception bezel width P_BZW may be wider than the bezel width BZW.

The display quality of the tiled display apparatus may improve by decreasing the perception bezel width P_BZW. The perception bezel width P_BZW may be changed according to a property of the image displayed on the partial display panels 100a even after the tiled display apparatus is manufactured.

In other exemplary embodiments, the display apparatus of FIG. 1 may be a single display apparatus, not part of the tiled display apparatus, although not shown.

Figure 4:
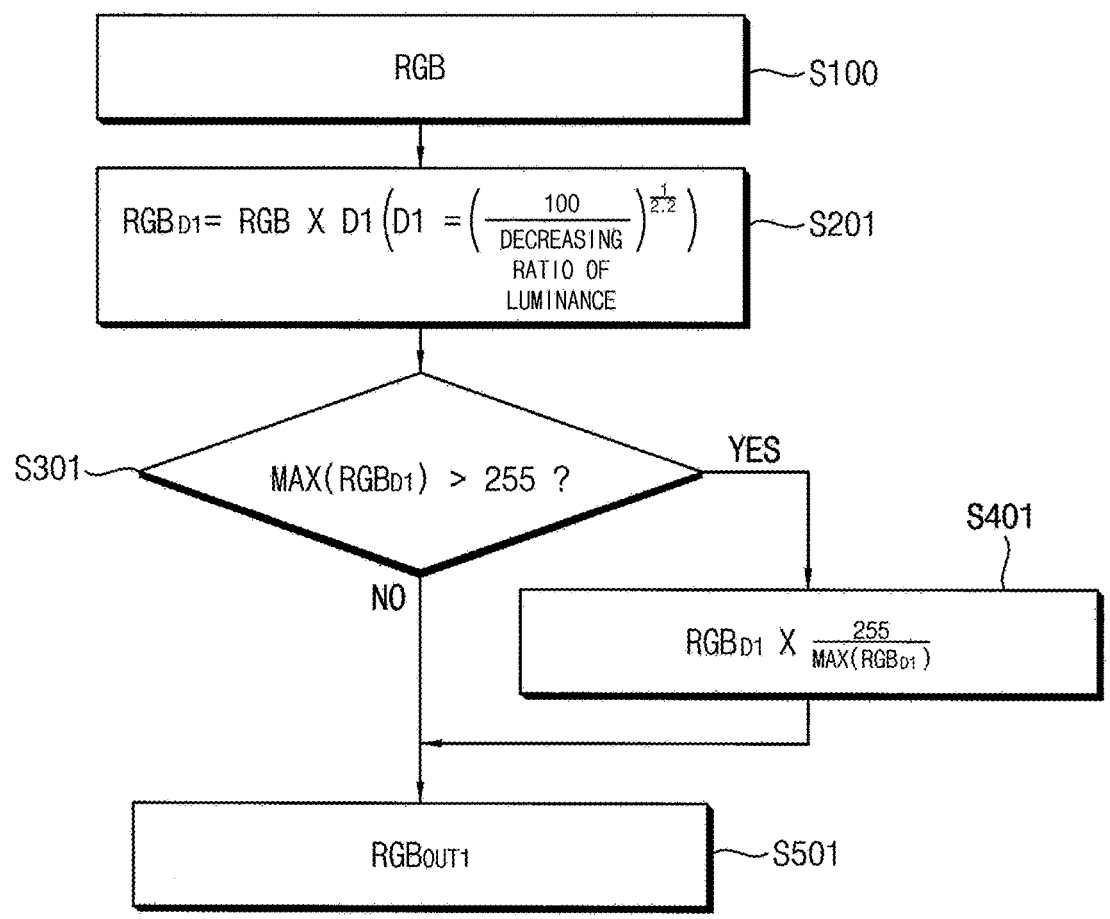
FIG. 4 is a flowchart illustrating an exemplary embodiment of a method for compensating decrease of luminance.
Figure 5:
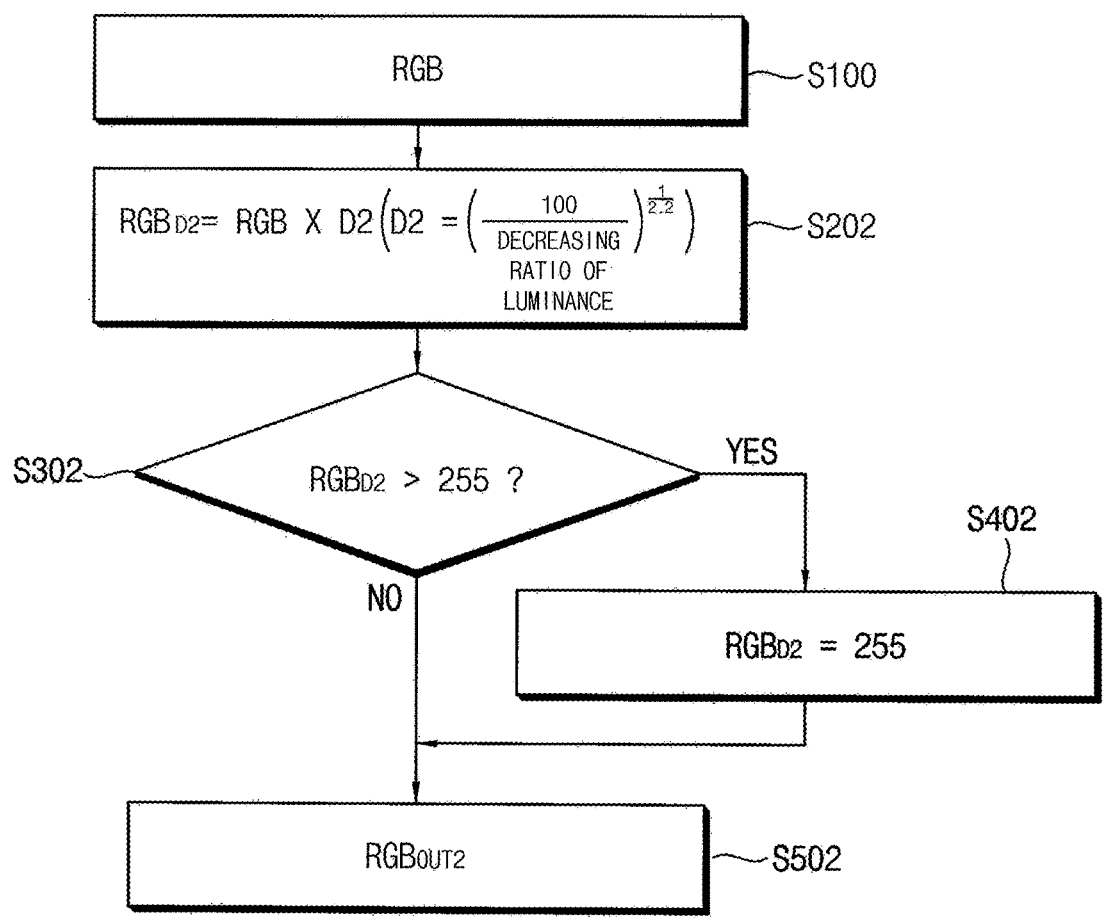
FIG. 5 is a flowchart illustrating an exemplary embodiment of a method for compensating decrease of luminance.
Figure 6:
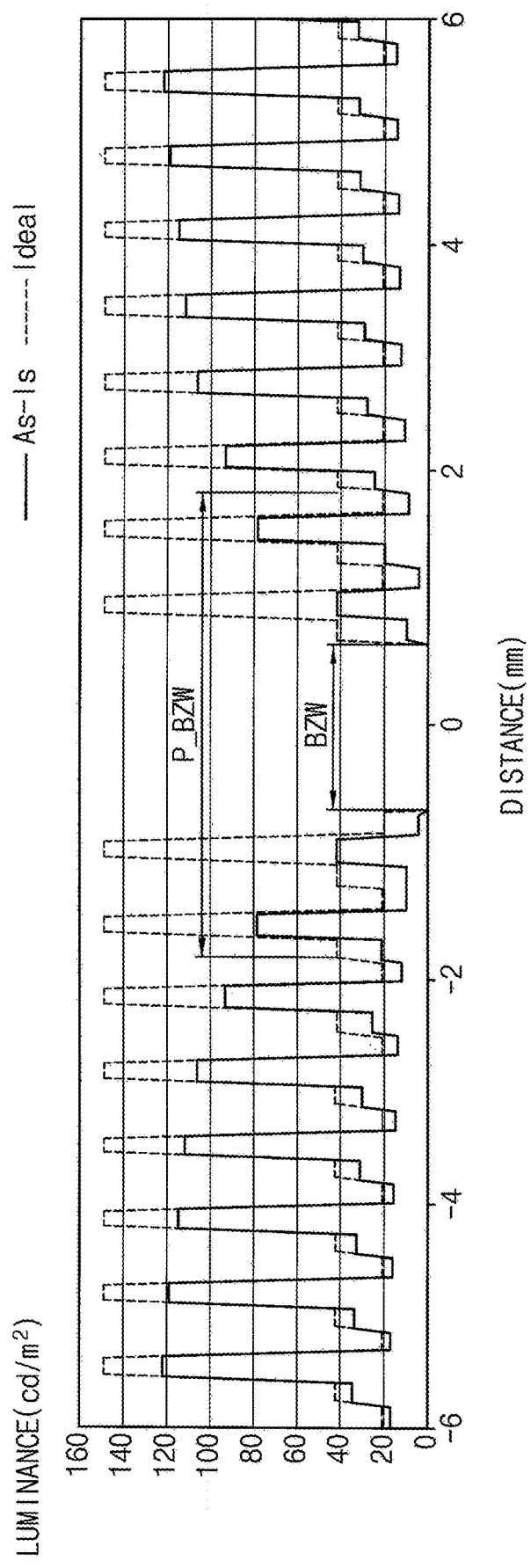
FIG. 6 is a graph illustrating an example of luminance of border portions of adjacent (partial) display apparatuses according to a distance from a center of a bezel.

FIG. 4 is a flowchart illustrating an exemplary embodiment of a method for compensating decrease of luminance, FIG. 5 is a flowchart illustrating an exemplary embodiment of a method for compensating decrease of luminance, and FIG. 6 is a graph illustrating an example of luminance of a border portion of adjacent (partial) display apparatuses according to a distance from a center of a bezel.

Specifically, FIG. 6 is a graph illustrating luminance, in terms of candela per square meter (cd/m$^2$) of pixels in a border portion (e.g., an edge region) of a partial display panel versus a distance, in terms of millimeters (mm), from a center of the bezel to calculate a decreasing ratio of luminance in methods of FIGS. 4 and 5.

Referring to FIGS. 1 through 3 and FIG. 6, the luminance of the pixel in the border portion of the partial display panel may be uniform in an ideal case (Ideal). However, the luminance of the pixel in the border portion of the partial display panel may decrease before applying a method for compensating decrease of luminance in an exemplary embodiment in a real case (As–Is).

The decreasing ratio of luminance may be a ratio (in percentage) of luminance in a real case (real luminance) to luminance in the ideal case (target luminance).

That is, the decreasing ratio of luminance may satisfy Equation 1.

$$\text{decreasing ratio of luminance} = \frac{\text{real luminance}}{\text{target luminance}} * 100 \qquad \text{<Equation 1>}$$

Here, the target luminance may be uniform or constant with respect to the pixels, and the real luminance may be changed depending on positions of the pixels, and may be measured. In some exemplary embodiments, the target luminance may be determined based on desired luminances of backlight sources included in a display apparatus at the positions of the respective pixels, and the desired luminances of backlight sources may be uniform or constant with respect to the pixels. The real luminance may be measured luminances of the backlight sources at the positions of the respective pixels, and the measured luminances of the backlight sources may be decreased as the position of each pixel becomes closer to an edge of the partial display panel. In other exemplary embodiments, the target luminance may be desired luminances of the respective pixels when input image data representing a predetermined gray level (e.g., a 255-gray level), and the desired luminances of the respective pixels may be uniform or constant with respect to the pixels. The real luminance may be measured luminances of the respective pixels at the positions of the respective pixels, and the measured luminances of the respective pixels may be decreased as the position of each pixel becomes closer to the edge of the partial display panel.

The decreasing ratio of luminance may have a value of 0 to 100. The decreasing ratio of luminance may be dependent on the property of the partial display panel 100a (or an arrangement of the backlight sources). A difference of the real luminance and the target luminance may increase as the decreasing ratio of luminance decreases. The decreasing ratio of luminance may decrease toward the edge of the partial display panel 100a when the method for compensating decrease of luminance is not applied. Specifically, the decreasing ratios of luminance of the sub-pixels included in the same pixel P may be different from each other. In an exemplary embodiment, for example, the decreasing ratio of luminance of a first sub-pixel disposed relatively close to the edge of the partial display panel 100a may be less than the decreasing ratio of a second sub-pixel relatively distant from the edge of the partial display panel 100a, although the first and second sub-pixels are included in the same pixel P.

The perception bezel width P_BZW may increase as decreasing ratio of luminance in the border portion of the partial display panel 100a decreases. That is, it is preferable to increase the decreasing ratio of luminance in the border portion of the partial display panel 100a in order to improve the display quality of the display apparatus.

The decreasing ratio of luminance of the pixels in the border portion of the partial display panel 100a may be stored in the timing controller 200. In an exemplary embodiment, the decreasing ratio of luminance may be stored based on the graph of FIG. 6, for example.

Referring to FIGS. 1, 2, 3, 4, and 6, the timing controller 200 may generate the compensation image data $RGB_{D1}$ based on the input image data RGB and the corresponding decreasing ratio of luminance (S201). The decreasing ratio of luminance of all sub-pixels in the same pixel P may be the same. The timing controller 200 may generate the compensation image data $RGB_{D1}$ using Equation 2.

$$RGB_{D1} = RGB * D1, \qquad \text{<Equation 2>}$$

$$\text{where } D1 = \left(\frac{100}{\text{decreasing ration of luminance}}\right)^{\frac{1}{\alpha}},$$

and α is a gamma value.

Here, the input image data RGB may represent an input red gray level, an input green gray level, and an input blue gray level, and the compensation image data $RGB_{D1}$ may represent a compensated red gray level, a compensated green gray level, and a compensated blue gray level. In an exemplary embodiment, each component of the input image data RGB may have a value of 0 to 255 grayscale, for example. In an exemplary embodiment, the value D1 may vary depending on the pixel P, and the value D1 may be commonly applied to the sub-pixels in the same pixel P.

In an exemplary embodiment, the timing controller 200 may receive the input image data RGB representing a first red gray level, a first green gray level, and a first blue gray level for a first pixel and may generate the compensation image data $RGB_{D1}$ having a first compensated red gray level, a first compensated green gray level, and a first compensated blue gray level, for example. The value D1 may be commonly applied to the sub-pixels included in the first pixel. The timing controller 200 may receive the input image data RGB having a second red gray level, a second green gray level, and a second blue gray level for a second pixel that is different from the first pixel and may generate the compensation image data $RGB_{D1}$ having a second compensated red gray level, a second compensated green gray level, and a second compensated blue gray level. A value D1 that is different from the value D1 of the first pixel may be commonly applied to the sub-pixels included in the second pixel.

The timing controller 200 may compare a greatest compensated gray level $MAX(RGB_{D1})$ to a 255-gray level, where the greatest compensated gray level $MAX(RGB_{D1})$ is the greatest value among the sub-pixels' compensated gray levels in the compensation image data $RGB_{D1}$ of the each pixel P (S301).

When the greatest compensated gray level $MAX(RGB_{D1})$ is greater than the 255-gray level, the timing controller 200 may adjust the compensation image data $RGB_{D1}$ of the pixel P using Equation 3, and the adjusted result may correspond to the final image data $RGB_{OUT1}$ (S401).

$$RGB_{OUT1} = RGB_{D1} * (255 / MAX(RGB_{D1})) \qquad \text{<Equation 3>}$$

When the greatest compensated gray level $MAX(RGB_{D1})$ is equal to or less than the 255-gray level, the compensation image data $RGB_{D1}$ may correspond to the final image data $RGB_{OUT1}$ without further compensation or adjustment. That is, the timing controller 200 may output the compensation image data $RGB_{D1}$ as the final image data $RGB_{OUT1}$.

In an exemplary embodiment, for example, when the red gray level of the input image data RGB of the first pixel is 200, the green gray level of the input image data RGB of the first pixel is 150, the blue gray level of the input image data RGB of the first pixel is 100, and the decreasing ratio of luminance is 50, the value D1 of the first pixel may be about 1.37. In this case, the red gray level of the compensation image data $RGB_{D1}$ of the first pixel may be about 274, the green gray level of the compensation image data $RGB_{D1}$ of the first pixel may be about 206, and the blue gray level of the compensation image data $RGB_{D1}$ of the first pixel may be about 137. In this case, the red gray level of the final image data $RGB_{OUT1}$ of the first pixel may be 255, the green gray level of the final image data $RGB_{OUT1}$ of the first pixel may be 192, the blue gray level of the final image data $RGB_{OUT1}$ of the first pixel may be 128 because the greatest compensated gray level $MAX(RGB_{D1})$ of the first pixel is 274 which is greater than 255, thereby the compensation image data $RGB_{D1}$ may be rescaled.

The timing controller 200 may generate the data signal DAT based on the final image data $RGB_{OUT1}$ and may output the data signal DAT to the data driver 500 (S501).

When the greatest compensated gray level $MAX(RGB_{D1})$ in each pixel is greater than the 255-gray level, color distortions almost do not occur because all sub-pixels in the pixel are clipped in the same ratio.

Referring to FIGS. 1, 2, 3, 5, and 6, in another exemplary embodiment, the timing controller 200 may generate the compensation image data $RGB_{D2}$ based on the input image data RGB and the corresponding decreasing ratio of luminance (S202). The decreasing ratios of luminance of sub-pixels in the same pixel P may be different from each other. The timing controller 200 may generate the compensation image data $RGB_{D2}$ using an Equation 4.

$$RGB_{D2} = RGB * D2, \qquad \text{<Equation 4>}$$

$$\text{where } D2 = \left(\frac{100}{\text{decreasing ratio of luminance}}\right)^{\frac{1}{\alpha}},$$

and α is a gamma value.

Here, the input image data RGB may represent one of an input red gray level, an input green gray level and an input blue gray level, and the compensation image data $RGB_{D2}$ may represent one of a compensated red gray level, a compensated green gray level and a compensated blue gray level which corresponds to the input image data RGB. In an exemplary embodiment, the input image data RGB may have a value of 0 to 255 grayscale, for example. In an exemplary embodiment, the value D2 may vary depending on a pixel P and a sub-pixel thereof, and the sub-pixels in the same pixel P may have the values D2 different from each other.

In an exemplary embodiment, the timing controller 200 may receive the input image data RGB having one of a first red gray level, a first green gray level, and a first blue gray level, and may generate the compensation image data $RGB_{D2}$ having one of a first compensated red gray level, a first compensated green gray level and a first compensated blue gray level, which corresponds to the input image data RGB, for example. The values D2 different from each other according to the sub-pixels may be applied to the sub-pixels included in the first pixel. The timing controller 200 may receive the input image data RGB having one of a second red gray level, a second green gray level and a second blue gray level, and may generate the compensation image data $RGB_{D2}$ having one of a second compensated red gray level, a second compensated green gray level and a second compensated blue gray level. The sub-pixels included in the second pixel may have the values D2 different from each other.

The timing controller 200 may compare each of the compensation image data $RGB_{D2}$ of the sub-pixels to the 255-gray level (S302).

When the compensation image data $RGB_{D2}$ is greater than the 255-gray level, the timing controller 200 may adjust the compensation image data $RGB_{D2}$ of the sub-pixel to the 255-gray level, and the adjusted result, or the 255-gray level may correspond to the final image data $RGB_{OUT2}$.

In an exemplary embodiment, when the red gray level of the input image data RGB of the first pixel is 200, the green gray level of the input image data RGB of the first pixel is 150, the blue gray level of the input image data RGB of the first pixel is 100, the decreasing ratio of luminance of the red sub-pixel is 60, the decreasing ratio of luminance of the green sub-pixel is 50, and the decreasing ratio of luminance of the blue sub-pixel is 40, the value D2 of the red sub-pixel pixel may be about 1.26, the value D2 of the green sub-pixel may be about 1.37, and the value D2 of the blue sub-pixel may be about 1.52, for example. In this case, the red gray level of the compensation image data $RGB_{D2}$ of the first pixel may be about 252, the green gray level of the compensation image data $RGB_{D2}$ of the first pixel may be about 206, and the blue gray level of the compensation image data $RGB_{D2}$ of the first pixel may be about 152. In this case, the red gray level of the final image data $RGB_{OUT2}$ of the first pixel may be 252, the green gray level of the final image data $RGB_{OUT2}$ of the first pixel may be 206, the blue gray level of the final image data $RGB_{OUT2}$ of the first pixel may be 152.

The timing controller 200 may generate the data signal DAT based on the final image data $RGB_{OUT2}$ and may output the data signal DAT to the data driver 500 (S502).

In the exemplary embodiment, the decrease of luminance may be compensated in detail because the difference of the decreasing ratio of the luminance of the sub-pixels in the same pixel according to the position is considered.

Figures 7, 8:
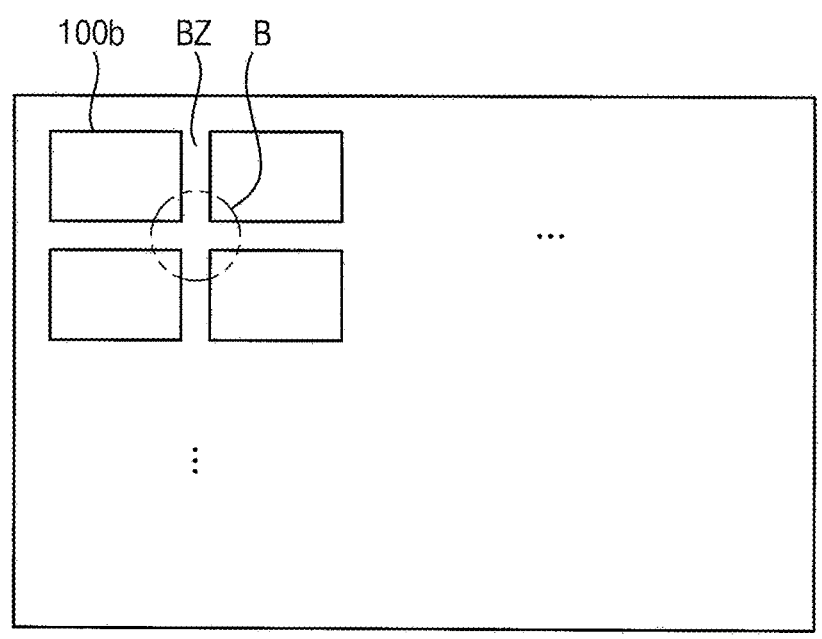
FIG. 7 is a table illustrating differences of perception bezel widths depending on whether an exemplary embodiment of a method for compensating decrease of luminance is applied to a display apparatus.
FIG. 8 is a diagram illustrating an exemplary embodiment of a screen of a tiled-display apparatus formed with a plurality of (partial) display apparatuses.

FIG. 7 is a table illustrating differences of perception bezel widths depending on whether an exemplary embodiment of a method for compensating decrease of luminance is applied to a display apparatus.

Referring to FIGS. 3 and 7, a model A is a display apparatus. A bezel width BZW of the model A may be about 2.30 mm, and a perception bezel width P_BZW(Ideal) of an ideal case may be about 2.33 mm. In a case that the exemplary embodiment of the invention is not applied, a perception bezel width P_BZW(As–Is) may be about 3.28 mm. In a case that the exemplary embodiment of the invention is applied, a perception bezel P_BZW may be about 2.76 mm. The perception bezel width decreases by about 0.52 mm in the case that the exemplary embodiment of the invention is applied compared to the case that the exemplary embodiment of the invention is not applied.

A model B is a display apparatus. A bezel width BZW of the model B may be about 1.49 mm, and a perception bezel width P_BZW(Ideal) of an ideal case may be about 1.48 mm. In a case that the exemplary embodiment of the invention is not applied, a perception bezel width P_BZW (As–Is) may be about 2.68 mm. In a case that the exemplary embodiment of the invention is applied, a perception bezel P_BZW may be about 1.95 mm. The perception bezel width decreases by about 0.73 mm in the case that the exemplary embodiment of the invention is applied compared to the case that the exemplary embodiment of the invention is not applied.

The luminance of the border portion of the partial display panel may be compensated to be similar with the ideal luminance shown in the graph of FIG. 6 by compensating the input image data, considering the decreasing ratio of luminance of the pixels or sub-pixels in the border portion of the partial display panel. Therefore, the perception bezel width may decrease.

Figure 9:
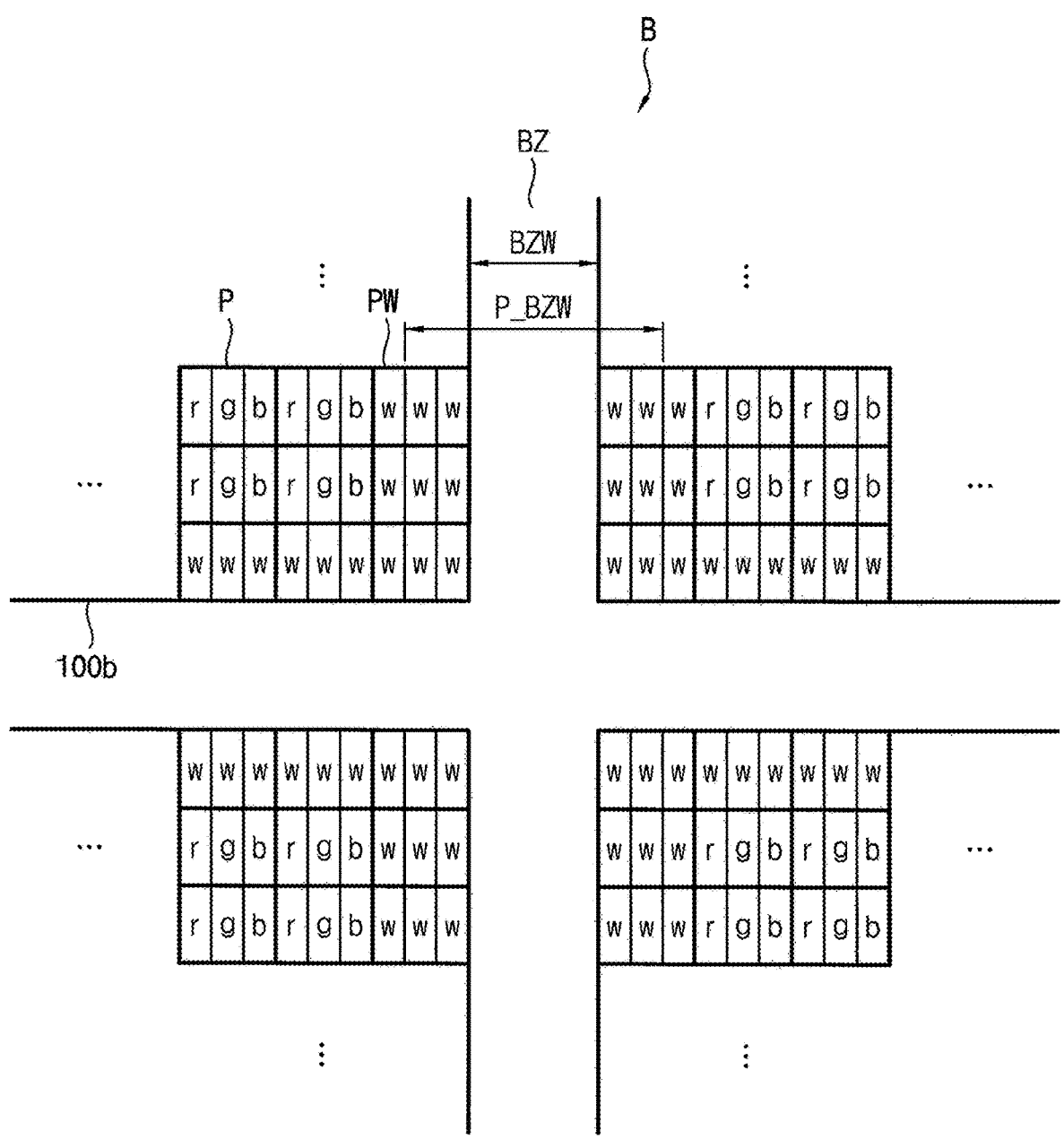
FIG. 9 is an enlarged diagram illustrating portion B of FIG. 8.

FIG. 8 is a diagram illustrating an exemplary embodiment of a screen of a tiled-display apparatus formed with a plurality of (partial) display apparatuses, and FIG. 9 is an enlarged diagram illustrating portion B of FIG. 8. Hereinafter, any repetitive explanation concerning FIGS. 2 and 3 will be omitted.

Referring to FIGS. 1, 8, and 9, the display apparatus in another exemplary embodiment may be one of a plurality of (partial) display apparatuses included in a tiled display apparatus. In this case, the display panel 100 included in the display apparatus in the exemplary embodiment of FIG. 1 may correspond to one of a plurality of partial screens included in a screen of the tiled display apparatus. That is, the display panel 100 may be one of partial display panels 100b of the tiled display apparatus.

A bezel BZ may be disposed between the partial display panels 100b of the tiled display apparatus.

The partial display panel 100b may include a plurality of pixels. In some exemplary embodiments, white pixels PW may be disposed in a border portion of the partial display panel 100b. In an exemplary embodiment, as illustrated in FIG. 9, the white pixels PW may be disposed in the outermost of the partial display panel 100b, for example. That is, the pixels disposed in a first column, a last column, a first row, and a last row may be the white pixels PW. Each white pixel PW may include a plurality of white sub-pixels w, or three white sub-pixels w. Each pixel P disposed in remaining portion except the outermost of the partial display panel 100b may include a red sub-pixel r, a green sub-pixel g, and a blue sub-pixel b.

The other partial display panels included in the tiled display apparatus may be substantially the same as the partial display panel 100b.

In an alternative exemplary embodiment, the display apparatus may be a single display apparatus rather than the part of the tiled display apparatus, although not shown.

Figure 10:
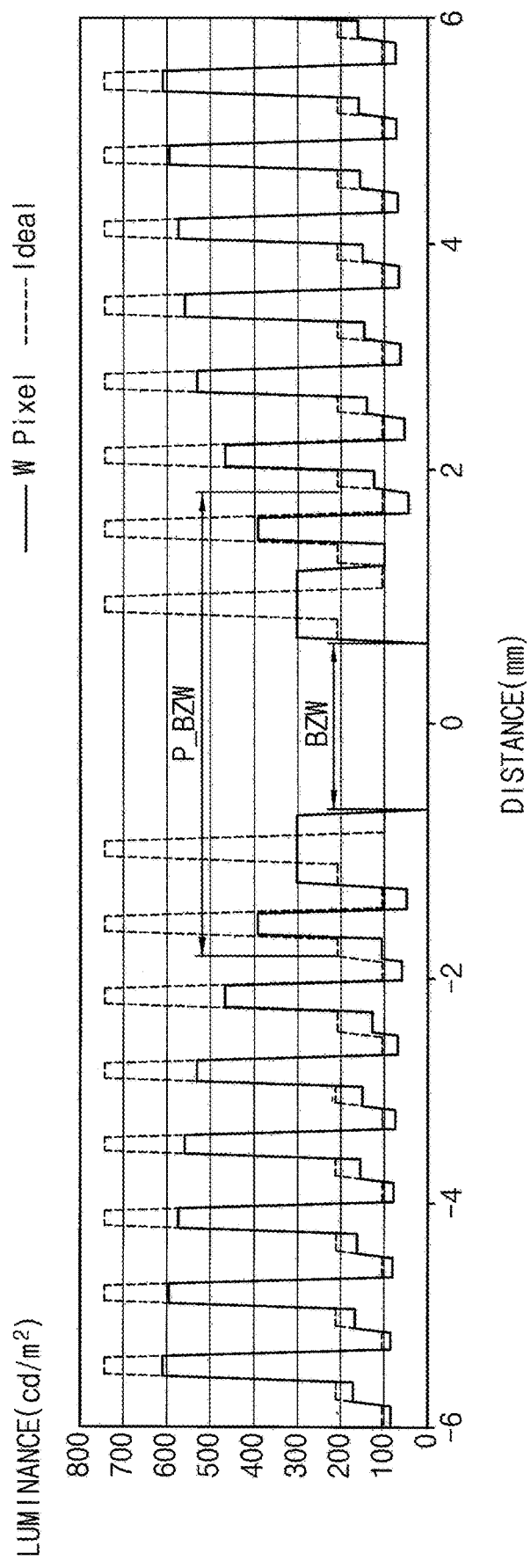
FIG. 10 is a graph illustrating an example of luminance of border portions of adjacent (partial) display apparatuses according to a distance from a center of a bezel.

FIG. 10 is a graph illustrating an example of luminance of border portions of adjacent (partial) display apparatuses according to a distance from a center of a bezel. Hereinafter, any repetitive explanation concerning FIGS. 4 through 6 will be omitted.

Specifically, FIG. 10 is a graph that represents luminance per pixel in a border portion of a display panel when a white image representing a 255-gray level is displayed on the display panel. FIG. 10 includes a luminance graph (W Pixel) when an exemplary embodiment of a method for compensating decrease of luminance is applied and another luminance graph (Ideal) in an ideal case.

Referring to FIGS. 1, 4, 5, 6, 8, 9, and 10, in the ideal case (Ideal), the luminance per pixels are uniform in the border portion of the partial display panel 100b. However, the luminance per pixels decreases toward the edge of the partial display panel 100b before applying an exemplary embodiment of the method for compensating decrease of luminance in a real case ("As–Is" illustrated in FIG. 6). The luminance of the pixel in the outermost of the partial display panel 100b increases when an exemplary embodiment (W Pixel) of the method for compensating decrease of luminance of the invention is applied as illustrated in FIG. 10.

In other exemplary embodiments, the timing controller 200 may compensate the input image data RGB corresponding to the white pixel PW and the input image data RGB corresponding to the pixel P using different methods.

Considering the decreasing ratio of luminance, the timing controller 200 may compensate the input image data RGB for the white pixel PW to have a luminance corresponding to the target luminance of the pixel P corresponding to the white pixel PW.

In an exemplary embodiment, for example, suppose that a ratio of luminance of the red, green, blue, and white sub-pixels is 2:7:1:10, all of the gray levels of the input image data RGB for the white pixel PW are 255, and the target luminance of the pixel P corresponding to the white unit pixel PW is 10, the luminance of the white pixel PW may be 30. In this case, the timing controller 200 may compensate the input image data RGB corresponding to the white pixel PW to allow the luminance of the white pixel PW to be 10, considering the decreasing ratio of luminance.

The timing controller 200 may also apply the method for compensating decrease of luminance of FIG. 4 or 5 to the input image data RGB corresponding to the pixel P.

The perception bezel width P_BZW(As–Is) of a display apparatus model may be about 2.68 mm when the method for compensating decrease of luminance in this exemplary embodiment of the invention is not applied. However, the perception bezel width P_BZW may decrease to about 1.46 mm when the method for compensating decrease of luminance in this exemplary embodiment of the invention is applied. That is, the perception bezel width may decrease by about 1.22 mm.

A yellow pixel may be used instead of the white pixel PW in another exemplary embodiment (not shown). The yellow pixel may include a plurality of yellow sub-pixels.

In this exemplary embodiment of the invention, the display apparatus may have the white pixels PW as the outermost pixels instead of the RGB pixels P. Therefore, the display apparatus may compensate the decrease of luminance in the border portion of the partial display panel even in the case that the maximum gray level is displayed since there is a margin in luminance to increase when the maximum gray level is displayed. Thus, the bezel width may decrease.

Figure 11:
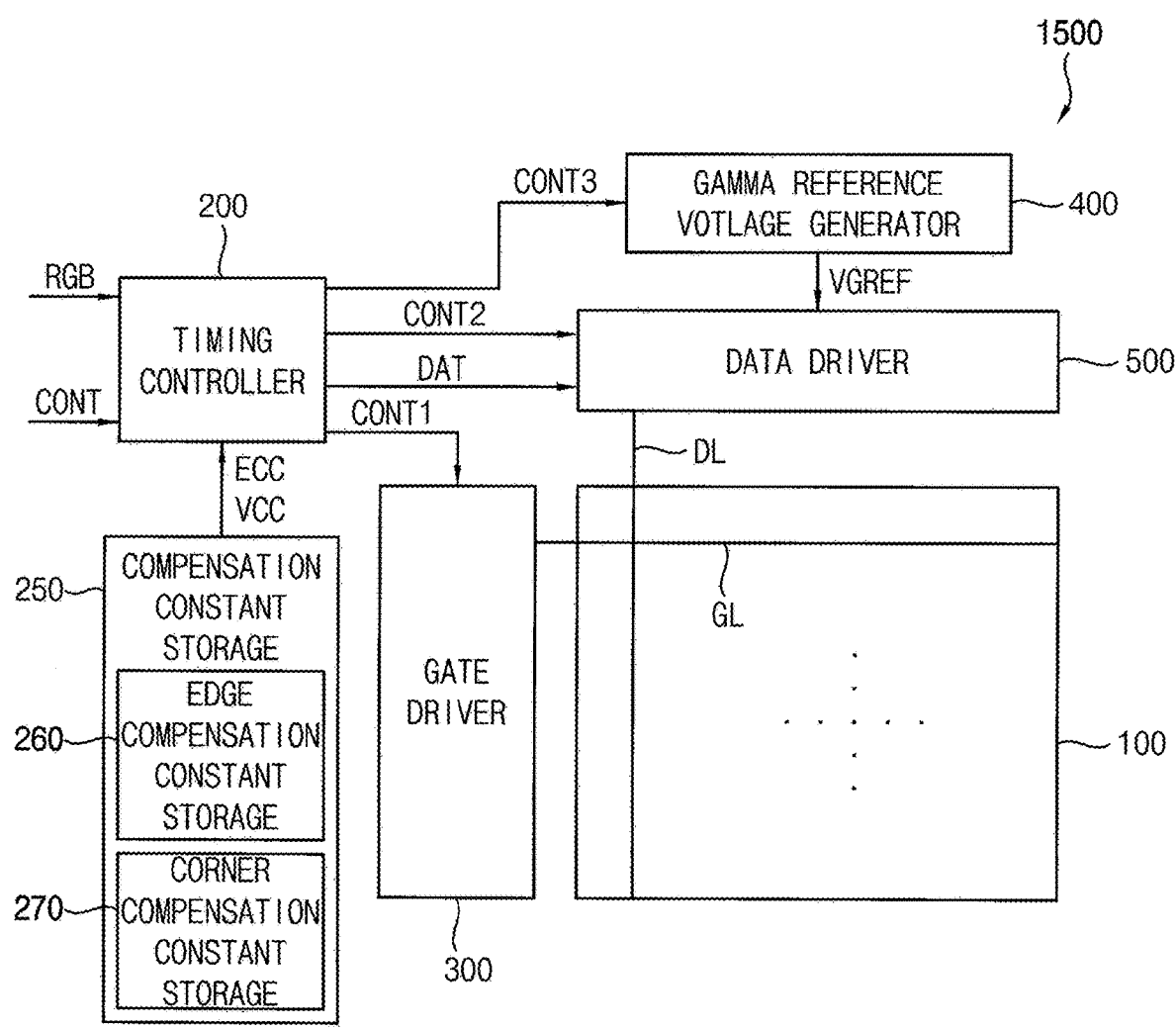
FIG. 11 is a block diagram illustrating an exemplary embodiment of a display apparatus.
Figure 12:
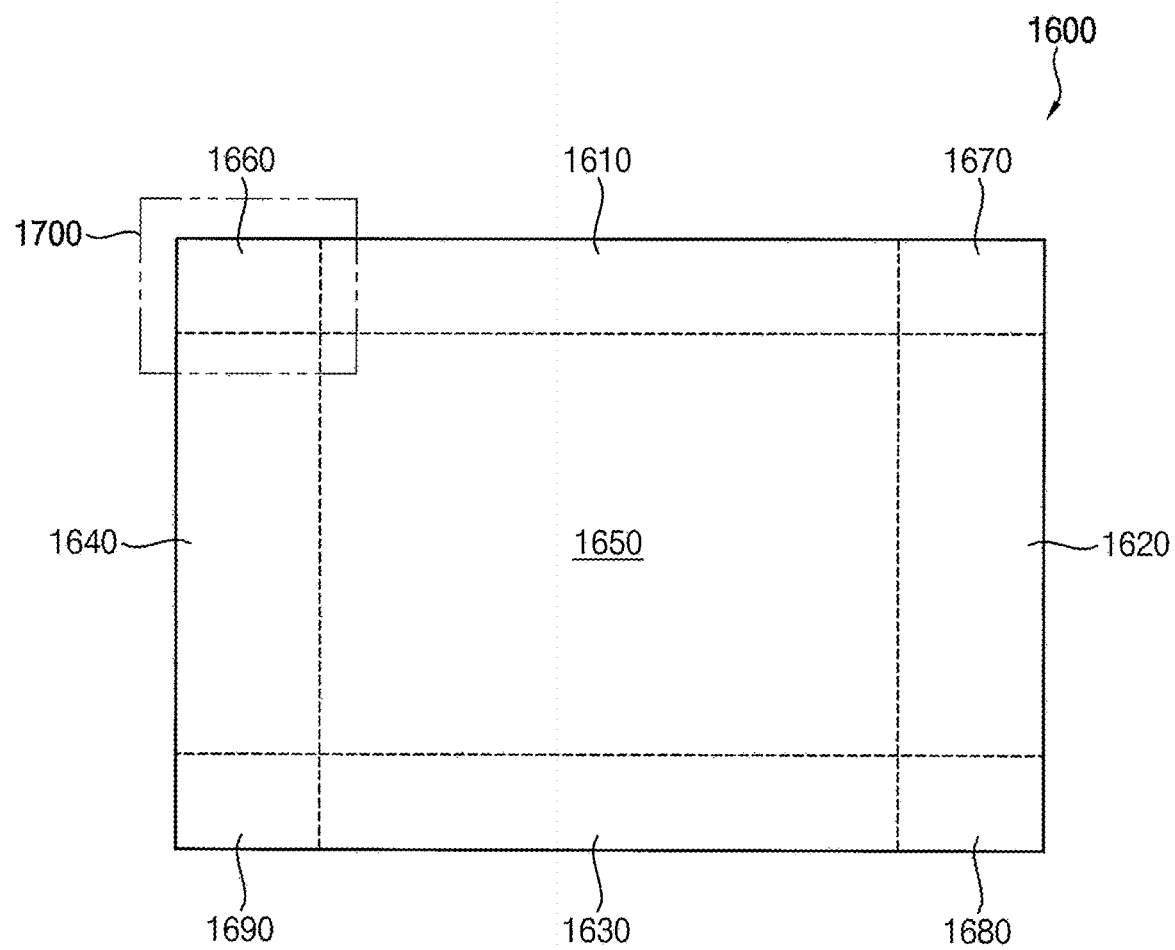
FIG. 12 is a diagram for describing an example where a border portion of a display panel are divided into four edge regions and four corner regions.
Figure 13:
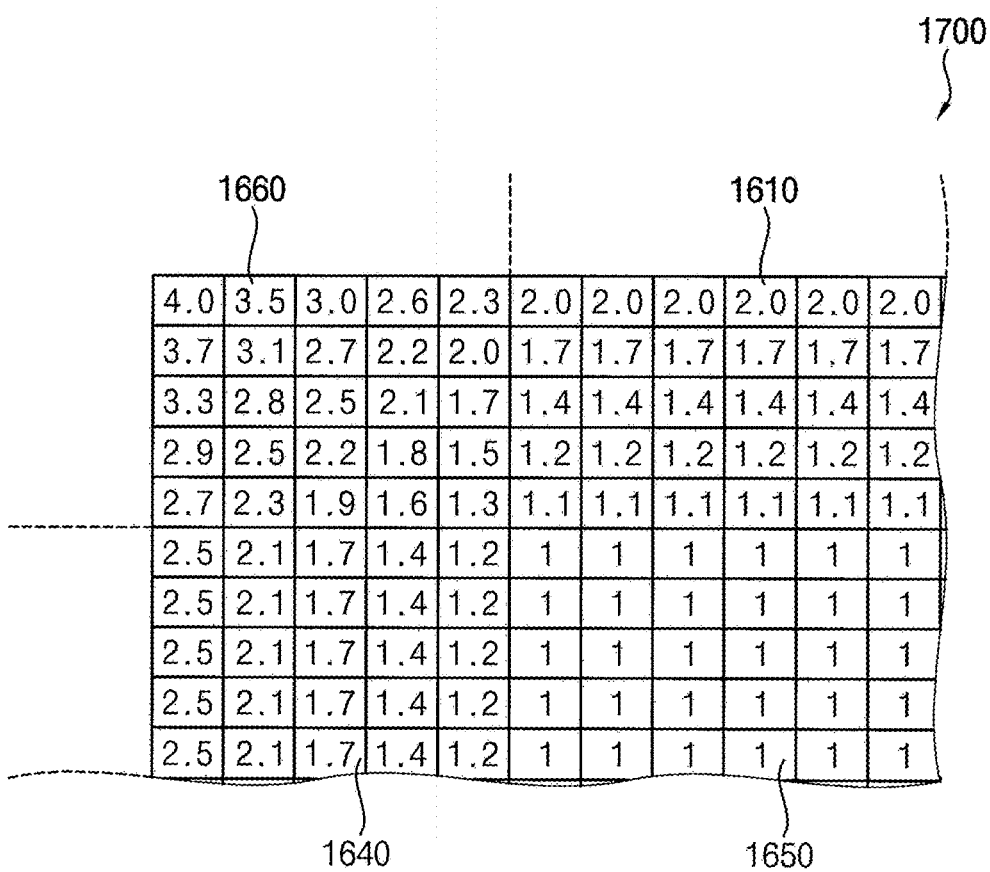
FIG. 13 is a diagram for describing an example of edge compensation constants and corner compensation constants.

FIG. 11 is a block diagram illustrating an exemplary embodiment of a display apparatus, FIG. 12 is a diagram for describing an example where a border portion of a display panel are divided into four edge regions and four corner regions, and FIG. 13 is a diagram for describing an example of edge compensation constants and corner compensation constants.

Referring to FIG. 11, a display apparatus 1500 in exemplary embodiments may include a display panel 100 including a plurality of pixels, and a driver driving the display panel 100. The driver may include a timing controller 200, a gate driver 300, a gamma reference voltage generator 400, a data driver 500 and a compensation constant storage 250. The display apparatus 1500 of FIG. 11 may have a similar configuration and a similar operation to a display apparatus of FIG. 1, except that the driver may further include the compensation constant storage 250. Although FIG. 11 illustrates an example where the compensation constant storage 250 is disposed outside the timing controller 200, in some exemplary embodiments, the compensation constant storage 250 may be implemented within the timing controller 200.

The driver (e.g., the timing controller 200 included in the driver) may receive input image data RGB, and may generate a data signal DAT representing final image data by compensating the input image data RGB to increase luminances of pixels disposed in a border portion of the display panel 100 among the plurality of pixels of the display panel 100. The driver (e.g., the data driver 500 included in the driver) may drive the display panel 100 based on the final image data represented by the data signal DAT.

In the display apparatus 1500 in exemplary embodiments, as illustrated in FIG. 12, the driver (e.g., the timing controller 200) may divide a display panel 100 and 1600 into a center portion 1650 and a border portion 1610, 1620, 1630, 1640, 1660, 1670, 1680 and 1690 surrounding the center portion 1650. Here, the border portion 1610, 1620, 1630, 1640, 1660, 1670, 1680 and 1690 may be determined based on a perception bezel width P_BZW illustrated in FIG. 3. In an exemplary embodiment, the border portion 1610, 1620, 1630, 1640, 1660, 1670, 1680 and 1690 may be a portion of a display area of the display panel 100 and 1600 from an edge of the display area to a line spaced apart by the perception bezel width P_BZW from the edge of the display area, or may be a portion of the display area of the display panel 100 and 1600 from the edge of the display area to a line spaced apart by the perception bezel width P_BZW plus a predetermined length from the edge of the display area, for example. In some exemplary embodiments, the display apparatus 1500 may be (e.g., detachably) attached to at least one other display apparatus, and the border portion 1610, 1620, 1630, 1640, 1660, 1670, 1680 and 1690 of the display panel 100 and 1600 may be adjacent to a bezel between the display panel 100 and 1600 of the display apparatus and a display panel of the at least one other display apparatus. The driver (e.g., the timing controller 200) may divide the border portion 1610, 1620, 1630, 1640, 1660, 1670, 1680 and 1690 of the display panel 100 and 1600 into four edge regions 1610, 1620, 1630 and 1640 and four corner regions 1660, 1670, 1680 and 1690 each being between adjacent two of the four edge regions 1610, 1620, 1630 and 1640, and may compensate the input image data RGB such that luminances of the edge regions 1610, 1620, 1630 and 1640 based on the input image data RGB may be increased (or multiplied) by a first multiplicative factor and luminances of the corner regions 1660, 1670, 1680 and 1690 based on the input image data RGB may be increased (or multiplied) by a second multiplicative factor greater than the first multiplicative factor.

In some exemplary embodiments, the pixels disposed in the center portion 1650 of the display area of the display panel 100 and 1600 may receive light from backlight sources in four directions (i.e., in upward, downward, leftward and rightward directions), but the pixels disposed in the border portion 1610, 1620, 1630, 1640, 1660, 1670, 1680 and 1690 surrounding the center portion 1650 within the display area of the display panel 100 and 1600 may not receive the light from the backlight sources in at least one of the four directions. Thus, the pixels disposed in the border portion 1610, 1620, 1630, 1640, 1660, 1670, 1680 and 1690 may have luminances lower than those of the pixels disposed in the center portion 1650. Further, the pixels disposed in the edge regions 1610, 1620, 1630 and 1640 may receive the light from the backlight sources in three of the four directions, and the pixels disposed in the corner regions 1660, 1670, 1680 and 1690 may receive the light from the backlight sources in two of the four directions. Thus, the pixels disposed in the corner regions 1660, 1670, 1680 and 1690 may have luminances lower than those of the pixels disposed in the edge regions 1610, 1620, 1630 and 1640. However, in the display apparatus 1500 in exemplary embodiments, since the input image data RGB are compensated such that the luminances of the edge regions 1610, 1620, 1630 and 1640 are increased by the first multiplicative factor and the luminances of the corner regions 1660, 1670, 1680 and 1690 may be increased by the second multiplicative factor greater than the first multiplicative factor, not only the luminance decrease of the border portion 1610, 1620, 1630, 1640, 1660, 1670, 1680 and 1690 compared with the center portion 1650, but also the luminance decrease of the corner regions 1660, 1670, 1680 and 1690 compared with the edge regions 1610, 1620, 1630 and 1640 may be compensated. Accordingly, the image quality of the display apparatus 1500 may be further improved.

In some exemplary embodiments, to increase the luminances of the edge regions 1610, 1620, 1630 and 1640 by the first multiplicative factor and to increase the luminances of the corner regions 1660, 1670, 1680 and 1690 by the second multiplicative factor greater than the first multiplicative factor, the compensation constant storage 250 may store edge compensation constants ECC with respect to the pixels disposed in the edge regions 1610, 1620, 1630 and 1640 among the plurality of pixels and corner compensation constants VCC greater than the edge compensation constants ECC with respect to the pixels disposed in the four corner regions 1660, 1670, 1680 and 1690 among the plurality of pixels, and the driver (e.g., the timing controller 200) may compensate the input image data RGB for the pixels disposed in the edge regions 1610, 1620, 1630 and 1640 with the edge compensation constants ECC and may compensate the input image data RGB for the pixels disposed in the corner regions 1660, 1670, 1680 and 1690 with the corner compensation constants VCC greater than the edge compensation constants ECC. Here, that the corner compensation constants VCC are greater than the edge compensation constants ECC may mean that the corner compensation constants VCC for corner region pixels disposed in one row or one column are greater than the edge compensation constants ECC for edge region pixels disposed in the same row or the same column. FIG. 13 illustrates an example of a 'compensation constant' or a value of 'compensation constant+1' for each pixel of a portion 1700 of the display panel 100 and 1600, which may correspond to a luminance multiplicative factor for each pixel. In an exemplary embodiment, as illustrated in FIGS. 12 and 13, the edge compensation constant ECC (or 'the edge compensation constant ECC+1') for pixels in a first row among the pixels in the first edge region 1610 may have a value of about 2.0, and the corner compensation constants VCC (or 'the corner compensation constants VCC+1') for pixels in the first row among the pixels in the first corner region 1660 may have values greater than about 2.0, or values of about 2.3, about 2.6, about 3.0, about 3.5 and about 4.0, for example.

In some exemplary embodiments, although it is not illustrated in FIG. 13, the edge compensation constants ECC for the first edge region 1610 may be different from the edge compensation constants ECC for the third edge region 1630, and the edge compensation constants ECC for the second edge region 1620 may be different from the edge compensation constants ECC for the fourth edge region 1640. In some exemplary embodiments, top and bottom dead spaces of the display apparatus 1500 may have different widths, and left and right dead spaces of the display apparatus 1500 may have different widths, for example. Further, in some exemplary embodiments, an apparatus structure of a backlight unit of the display apparatus 1500 may be different between top and bottom portions and between left and right portions. Accordingly, in this case, a level of the luminance decrease of the first edge region 1610 may be different from a level of the luminance decrease of the third edge region 1630, and a level of the luminance decrease of the second edge region 1620 may be different from a level of the luminance decrease of the fourth edge region 1640. In some exemplary embodiments, to compensate for the luminance decrease level difference between the first and third edge regions 1610 and 1630 and the luminance decrease level difference between the second and fourth edge regions 1620 and 1640, the first edge region 1610 and the third edge region 1630 may have the edge compensation constants ECC different from each other, and the second edge region 1620 and the fourth edge region 1640 may have the edge compensation constants ECC different from each other. Further, in some exemplary embodiments, the first through fourth corner regions 1660, 1670, 1680 and 1690 may have the corner compensation constants VCC different from each other.

In some exemplary embodiments, the compensation constant storage 250 may include an edge compensation constant storage 260 that stores the edge compensation constants ECC, and a corner compensation constant storage 270 that stores the corner compensation constants VCC. In some exemplary embodiments, the edge compensation constants ECC for each of the edge regions 1610, 1620, 1630 and 1640 may gradually increase along a first direction toward a bezel, and may be constant along a second direction perpendicular to the first direction. The edge compensation constant storage 260 may be implemented, with respect to each of the edge regions 1610, 1620, 1630 and 1640, with a one-dimensional lookup table storing the edge compensation constants ECC gradually increasing along the first direction. Further, the corner compensation constants VCC for each of the corner regions 1660, 1670, 1680 and 1690 may gradually increase along the first direction, and may gradually increase along the second direction. The corner compensation constant storage 270 may be implemented, with respect to each of the corner regions 1660, 1670, 1680 and 1690, with a two-dimensional lookup table storing the corner compensation constants VCC gradually increasing along the first direction and along the second direction.

In an exemplary embodiment, as illustrated in FIG. 13, the edge compensation constants ECC (or 'the edge compensation constants ECC+1') for the first edge region 1610 may gradually increase to about 1.1, about 1.2, about 1.4, about 1.7 and about 2.0 along a vertical direction DY toward the bezel, and may be constant or uniform along a horizontal direction DX perpendicular to the vertical direction DY, for example. Further, the edge compensation constants ECC (or 'the edge compensation constants ECC+1') for the fourth edge region 1640 may gradually increase to about 1.2, about 1.4, about 1.7, about 2.1 and about 2.5 along the horizontal direction DX toward the bezel, may be constant or uniform along the vertical direction DY perpendicular to the horizontal direction DX. The edge compensation constant storage 260 may be implemented, with respect to each of the edge regions 1610, 1620, 1630 and 1640, with the one-dimensional lookup table storing the edge compensation constants ECC that gradually increase along one of the horizontal direction DX or the vertical direction DY and are constant or uniform along the other of the horizontal direction DX or the vertical direction DY.

Further, for example, as illustrated in FIG. 13, the corner compensation constants VCC (or 'the corner compensation constants VCC+1') for the first corner region 1660 may gradually increase, for example to about 2.3, about 2.6, about 3.0, about 3.5 and about 4.0 in the first row, along the horizontal direction DX toward the bezel, and may gradually increase, for example to about 2.7, about 2.9, about 3.3, about 3.7 and about 4.0 in a first column, along the vertical direction DY toward the bezel. The corner compensation constant storage 270 may be implemented, with respect to each of the corner regions 1660, 1670, 1680 and 1690, with the two-dimensional lookup table storing the corner compensation constants VCC that gradually increase along both of the horizontal direction DX and the vertical direction DY.

In some exemplary embodiments, the edge compensation constants ECC and the corner compensation constants VCC may be determined based on a target luminance that is uniform or constant with respect to the plurality of pixels and real luminances that are changed depending on positions of the plurality of pixels. In an exemplary embodiment, the target luminance may be determined based on desired luminances of backlight sources included in the display apparatus at the positions of the respective pixels, and the desired luminances of backlight sources may be uniform or constant with respect to the pixels, for example. The real luminance may be measured luminances of the backlight sources at the positions of the respective pixels, and the measured luminances of the backlight sources may be decreased as the position of each pixel becomes closer to an edge of the display panel 100. In another example, the target luminance may be desired luminances of the respective pixels when the input image data RGB representing a predetermined gray level (e.g., a 255-gray level), and the desired luminances of the respective pixels may be uniform or constant with respect to the pixels. The real luminance may be measured luminances of the respective pixels at the positions of the respective pixels, and the measured luminances of the respective pixels may be decreased as the position of each pixel becomes closer to the edge of the display panel 100.

Further, in some exemplary embodiments, the edge compensation constant ECC or the corner compensation constant VCC for each pixel in the edge region 1610, 1620, 1630 or 1640 or the corner region 1660, 1670, 1680 or 1690 may be determined by an equation "W=Lt/Lr−1". Here, W may represent the edge compensation constant ECC with respect to the pixel in the edge region 1610, 1620, 1630 or 1640 or the corner compensation constant VCC with respect to the pixel in the corner region 1660, 1670, 1680 or 1690, Lt may represent a target luminance of the pixel, and Lr may represent a real luminance of the pixel. That is, with respect to a 'decreasing ratio of luminance' described above with reference to FIGS. 4 through 6, the edge compensation constant ECC or the corner compensation constant VCC may be equal to "(100 divided by 'decreasing ratio of luminance')". According to the equation, the edge compensation constant ECC or the corner compensation constant VCC may be a value obtained by dividing a difference between the target luminance Lt and the real luminance Lr by the real luminance Lr, and may be increased as a decrement of the real luminance Lr from the target luminance Lt increases. Each pixel may include a plurality of sub-pixels. In some exemplary embodiments, as described above with reference to FIG. 4, the same edge compensation constant ECC or the same corner compensation constant VCC may be applied to the sub-pixels included in the same pixel in the edge region 1610, 1620, 1630 or 1640 or the corner region 1660, 1670, 1680 or 1690. In other exemplary embodiments, as described above with reference to FIG. 5, different edge compensation constants ECC or different corner compensation constants VCC may be applied to the sub-pixels included in the same pixel in the edge region 1610, 1620, 1630 or 1640 or the corner region 1660, 1670, 1680 or 1690.

As described above, in the display apparatus 1500 in exemplary embodiments, the border portion 1610, 1620, 1630, 1640, 1660, 1670, 1680 and 1690 of the display panel 100 and 1600 may be divided into the four edge regions 1610, 1620, 1630 and 1640 and the four corner regions 1660, 1670, 1680 and 1690, and the input image data RGB may be compensated such that the luminances of the edge regions 1610, 1620, 1630 and 1640 are increased by the first multiplicative factor and the luminances of the corner regions 1660, 1670, 1680 and 1690 are increased by the second multiplicative factor greater than the first multiplicative factor. Accordingly, not only the luminance decrease of the border portion 1610, 1620, 1630, 1640, 1660, 1670, 1680 and 1690 compared with the center portion 1650, but also the luminance decrease of the corner regions 1660, 1670, 1680 and 1690 compared with the edge regions 1610, 1620, 1630 and 1640 may be compensated, and thus the image quality of the display apparatus 1500 may be further improved.

Hereinafter, an operation of the display apparatus 1500 will be described below with reference to FIGS. 11 through 14.

Figure 14:
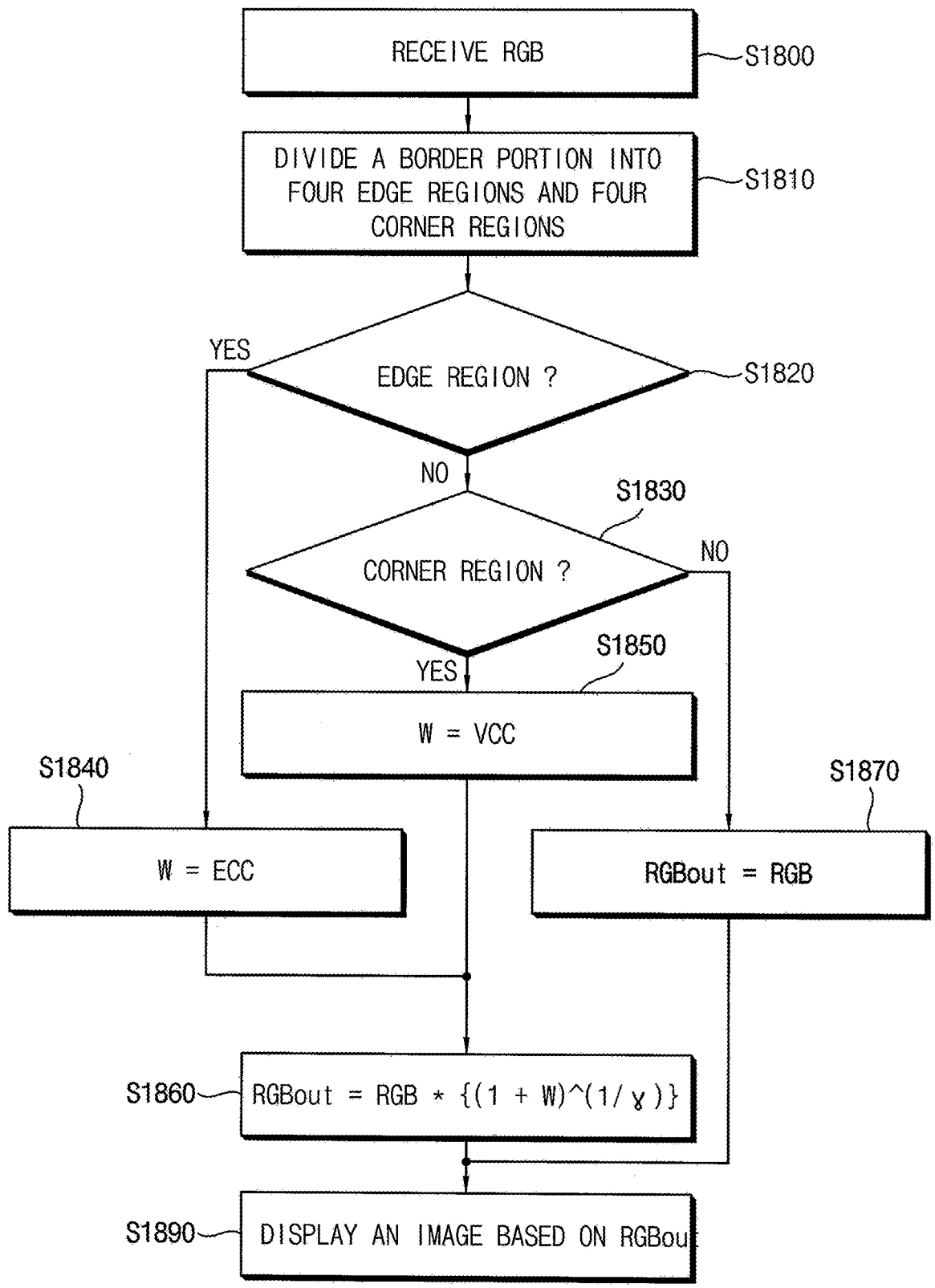
FIG. 14 is a flowchart illustrating an exemplary embodiment of a method for compensating decrease of luminance.

FIG. 14 is a flowchart illustrating an exemplary embodiment of a method for compensating decrease of luminance.

Referring to FIGS. 11 through 14, a driver (e.g., a timing controller 200) of a display apparatus 1500 may receive input image data RGB from an external device (e.g., a host processor) (S1800). The input image data RGB may be, but not limited to, RGB image data including red image data, green image data and blue image data.

The driver (e.g., the timing controller 200) may divide a border portion 1610, 1620, 1630, 1640, 1660, 1670, 1680 and 1690 surrounding a center portion 1650 of a display panel 100 and 1600 into four edge regions 1610, 1620, 1630 and 1640 and four corner regions 1660, 1670, 1680 and 1690 each being between adjacent two of the four edge regions 1610, 1620, 1630 and 1640 (S1810). In an exemplary embodiment, the border portion 1610, 1620, 1630, 1640, 1660, 1670, 1680 and 1690 may be a portion of a display area of the display panel 100 and 1600 from an edge of the display area to a line spaced apart by the perception bezel width P_BZW from the edge of the display area, or may be a portion of the display area of the display panel 100 and 1600 from the edge of the display area to a line spaced apart by the perception bezel width P_BZW plus a predetermined length from the edge of the display area, for example.

With respect to the input image data RGB for each pixel in the four edge regions 1610, 1620, 1630 and 1640 (S1820: YES), the driver (e.g., the timing controller 200) may set a compensation constant W for the pixel as an edge compensation constant ECC for the pixel (S1840), and may generate final image data RGBout for the pixel by compensating the input image data RGB for the pixel by an equation "RGBout=RGB*{(1+W)^(1/γ)}". Here, RGBout may represent the final image data for the pixel, RGB may represent the input image data for the pixel, W may represent the edge compensation constant ECC for the pixel, and γ may represent a gamma value (e.g., about 2.2) of the display apparatus 1500.

With respect to the input image data RGB for each pixel in the four corner regions 1660, 1670, 1680 and 1690

(S1820: NO and S1830: YES), the driver (e.g., the timing controller 200) may set the compensation constant W for the pixel as a corner compensation constant VCC for the pixel (S1850), and may generate the final image data RGBout for the pixel by compensating the input image data RGB for the pixel by the equation "RGBout=RGB*{(1+W)^(1/γ)}". Here, RGBout may represent the final image data for the pixel, RGB may represent the input image data for the pixel, W may represent the corner compensation constant VCC for the pixel, and γ may represent the gamma value (e.g., about 2.2) of the display apparatus 1500. In some exemplary embodiments, the corner compensation constants VCC for the corner regions 1660, 1670, 1680 and 1690 may be greater than the edge compensation constants ECC for the edge regions 1610, 1620, 1630 and 1640. Thus, luminances of the edge regions 1610, 1620, 1630 and 1640 may be increased by a first multiplicative factor, and luminances of the corner regions 1660, 1670, 1680 and 1690 may be increased by a second multiplicative factor greater than the first multiplicative factor. Accordingly, not only the luminance decrease of the border portion 1610, 1620, 1630, 1640, 1660, 1670, 1680 and 1690 compared with the center portion 1650, but also the luminance decrease of the corner regions 1660, 1670, 1680 and 1690 compared with the edge regions 1610, 1620, 1630 and 1640 may be compensated, and thus the image quality of the display apparatus 1500 may be further improved.

In some exemplary embodiments, in a case where a gray level represented by the final image data RGBout generated based on the equation of the operation of S1860 exceeds the maximum gray level (e.g., a 255-gray level), the driver (e.g., the timing controller 200) may output the final image data RGBout representing the maximum gray level. That is, the driver (e.g., the timing controller 200) may perform clipping on the final image data RGBout exceeding the maximum gray level (e.g., the 255-gray level).

With respect to the input image data RGB for each pixel in the center portion 1650 (S1820: NO and S1830: NO), the driver (e.g., the timing controller 200) may generate the final image data RGBout the same as the input image data RGB for the pixel (S1870). In an exemplary embodiment, with respect to the input image data RGB for the pixel in the center portion 1650, the driver (e.g., the timing controller 200) may not perform the compensation of the operation of S1860, or may perform the compensation of the operation of S1860 with the compensation constant W of 0, for example.

As described above, to increase the luminances of the edge regions 1610, 1620, 1630 and 1640 by the first multiplicative factor and to increase the luminances of the corner regions 1660, 1670, 1680 and 1690 by the second multiplicative factor greater than the first multiplicative factor, the display apparatus 1500 may generate the final image data RGBout for the pixels in the edge regions 1610, 1620, 1630 and 1640 by compensating the input image data RGB for the pixels in the edge regions 1610, 1620, 1630 and 1640 with the edge compensation constants ECC (S1820: YES, S1840 and S1860), may generate the final image data RGBout for the pixels in the corner regions 1660, 1670, 1680 and 1690 by compensating the input image data RGB for the pixels in the corner regions 1660, 1670, 1680 and 1690 with the corner compensation constants VCC greater than the edge compensation constants ECC (S1820: NO, S1830: YES, S1850 and S1860), and may generate the final image data RGBout for the pixels in the center portion 1650 the same as the input image data RGB (S1820: NO, S1830: NO and S1870). Further, the driver of the display apparatus 1500 may drive the display panel 100 and 1600 based on the final image data RGBout to display an image corresponding to the final image data RGBout (S1890). Accordingly, not only the luminance decrease of the border portion 1610, 1620, 1630, 1640, 1660, 1670, 1680 and 1690 compared with the center portion 1650, but also the luminance decrease of the corner regions 1660, 1670, 1680 and 1690 compared with the edge regions 1610, 1620, 1630 and 1640 may be compensated. Accordingly, the image quality of the display apparatus 1500 may be further improved.

Figure 15:
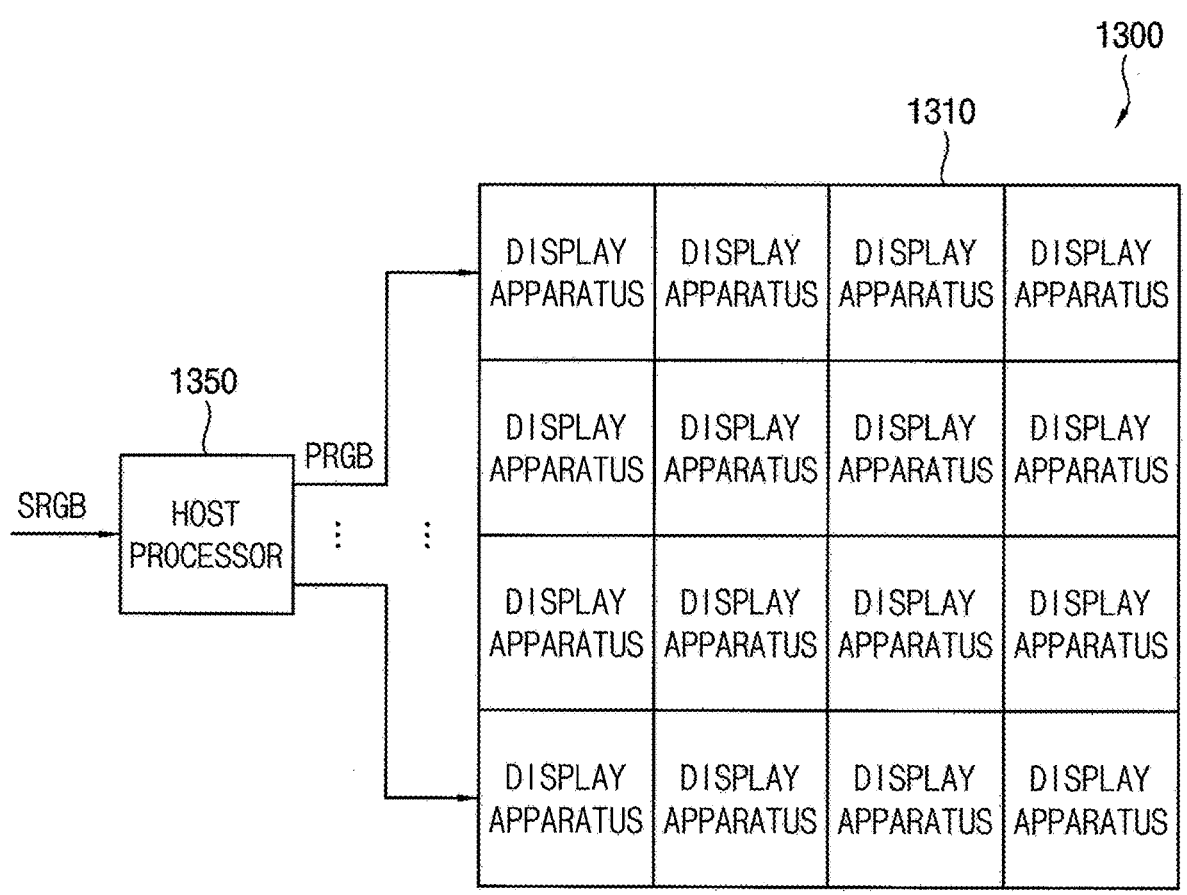
FIG. 15 is a block diagram illustrating an exemplary embodiment of a display system.
Figure 16:
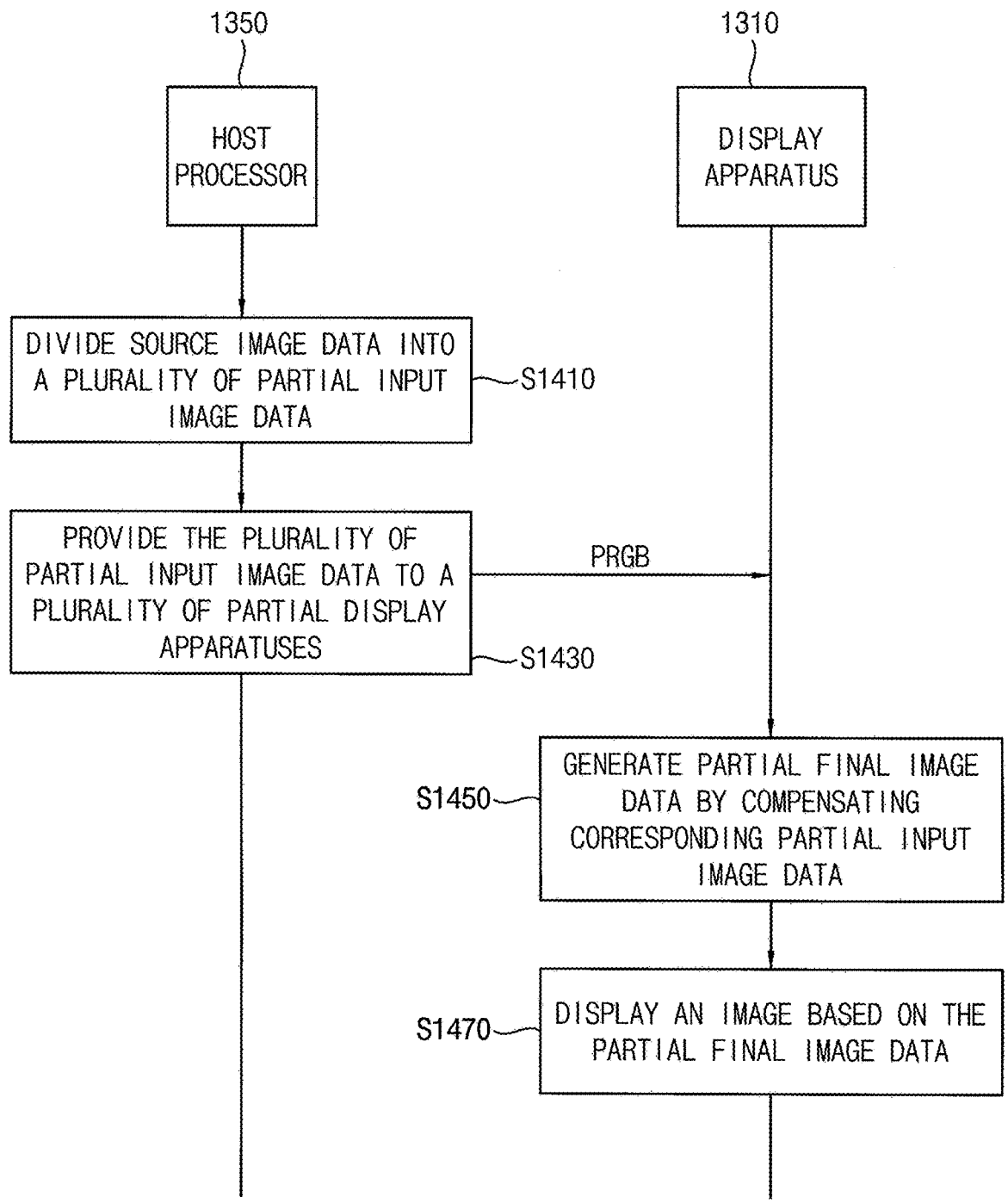
FIG. 16 is a flowchart illustrating an exemplary embodiment of an operation of a display system.
Figure 17:
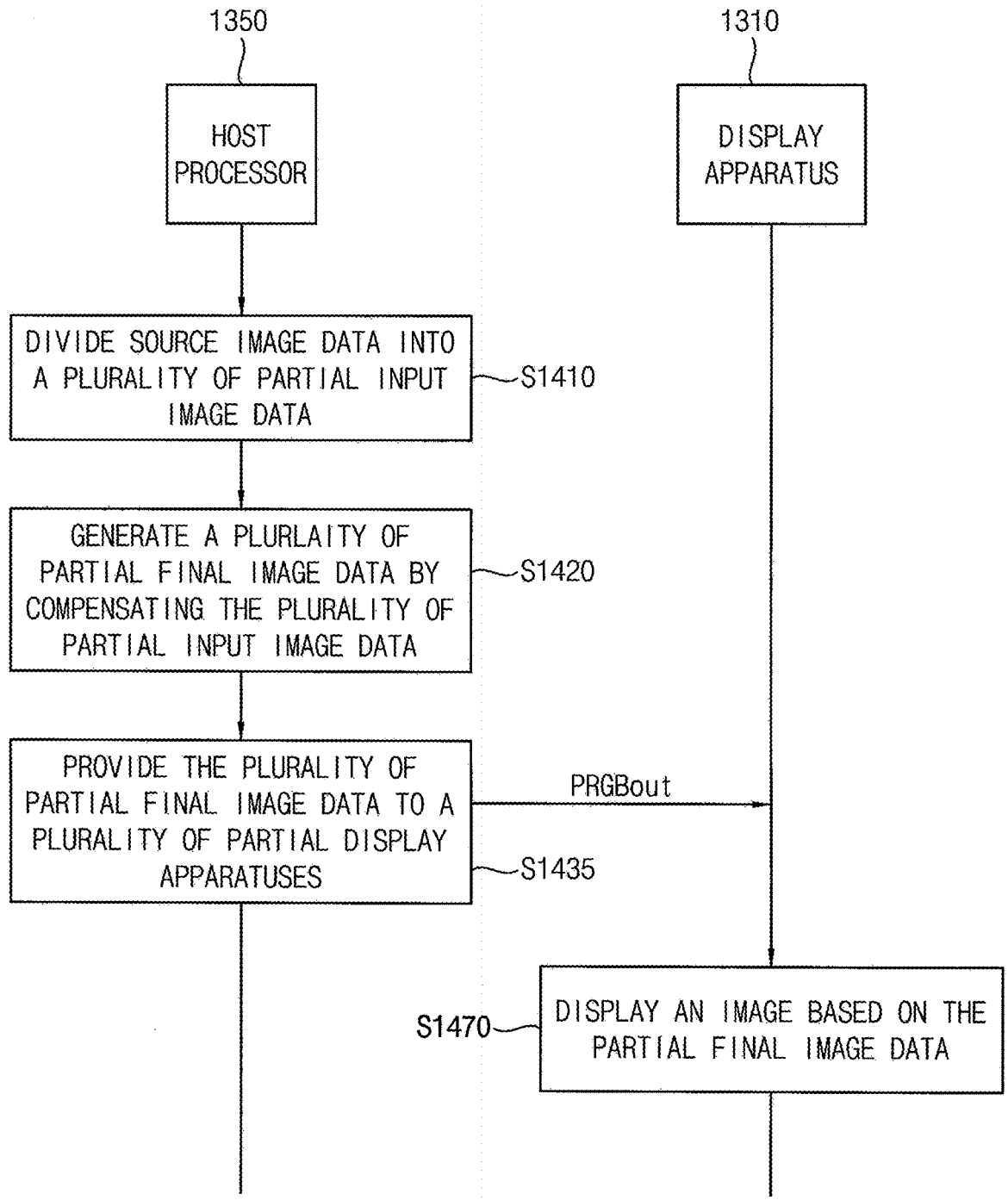
FIG. 17 is a flowchart illustrating another exemplary embodiment of an operation of a display system.

FIG. 15 is a block diagram illustrating an exemplary embodiment of a display system, FIG. 16 is a flowchart illustrating an exemplary embodiment of an operation of a display system, and FIG. 17 is a flowchart illustrating another exemplary embodiment of an operation of a display system.

Referring to FIG. 15, a display system 1300 in exemplary embodiments may include a plurality of (partial) display apparatuses 1310, and a host processor 1350 providing image data PRGB to the plurality of (partial) display apparatuses 1310. In some exemplary embodiments, each of the plurality of (partial) display apparatuses 1310 may be a display apparatus of FIG. 1 or a display apparatus 1500 of FIG. 11. In some exemplary embodiments, the display system 1300 may be a tiled-display apparatus where the plurality of (partial) display apparatuses 1310 is arranged in a tile shape.

The plurality of (partial) display apparatuses 1310 may be arranged in the tile shape or a matrix form. Although FIG. 15 illustrates an example where the plurality of (partial) display apparatuses 1310 is arranged in a 4*4 matrix form, in exemplary embodiment, the display system 1300 may include plurality of (partial) display apparatuses 1310 arranged in a N*M matrix form, where each of N and M is any integer greater than 0. In some exemplary embodiments, the plurality of (partial) display apparatuses 1310 may be detachably attached to each other.

The host processor 1350 may receive source image data SRGB. In an exemplary embodiment, the host processor 1350 may receive the source image data SRGB broadcasted from an external device (e.g., a station), or may receive the source image data SRGB from an internal memory device, for example. The host processor 1350 may divide the source image data SRGB into a plurality of partial input image data PRGB respectively corresponding to the plurality of (partial) display apparatuses 1310, and may provide the plurality of partial input image data PRGB to the plurality of (partial) display apparatuses 1310, respectively. In an exemplary embodiment, the host processor 1350 may be coupled to the plurality of (partial) display apparatuses 1310 in a multi-drop manner, and the host processor 1350 may provide corresponding partial input image data PRGB to each (partial) display apparatus 1310, for example.

In some exemplary embodiments, as illustrated in FIG. 16, each (partial) display apparatus 1310 of the display system 1300 may perform edge (or border) luminance increasing compensation as illustrated in FIGS. 4, 5 and 14. The host processor 1350 may divide the source image data SRGB into the plurality of partial input image data PRGB respectively corresponding to the plurality of (partial) display apparatuses 1310 (S1410), and may provide the plurality of partial input image data PRGB to the plurality of (partial) display apparatuses 1310, respectively (S1430). Each (partial) display apparatus 1310 may generate partial final image data PRGBout by compensating the corresponding partial input image data PRGB to increase luminances of pixels disposed in a border portion of a partial display panel (S1450), and may display an image based on the partial final image data PRGBout (S1470). In some exemplary embodiments, as described above with reference to FIGS. 11 through 14, a driver of each (partial) display apparatus 1310 may divide the border portion of the partial display panel into four edge regions and four corner regions, may generate partial final image data PRGBout by compensating the corresponding partial input image data PRGB such that luminances of the edge regions are increased by a first multiplicative factor and luminances of the corner regions are increased by a second multiplicative factor greater than the first multiplicative factor, and may drive the partial display panel based on the partial final image data PRGBout. Thus, not only the luminance decrease of the border portion of each (partial) display apparatus 1310 compared with a center portion of each (partial) display apparatus 1310, but also the luminance decrease of the corner regions of each (partial) display apparatus 1310 compared with the edge regions of each (partial) display apparatus 1310 may be compensated. Accordingly, the image quality of the display system 1300 may be further improved.

In other exemplary embodiments, as illustrated in FIG. 17, the host processor 1350 of the display system 1300 may perform the edge (or border) luminance increasing compensation as illustrated in FIGS. 4, 5 and 14. The host processor 1350 may divide the source image data SRGB into the plurality of partial input image data PRGB respectively corresponding to the plurality of (partial) display apparatuses 1310 (S1410), may generate a plurality of partial final image data PRGBout by compensating the plurality of partial input image data PRGB to increase luminances of pixels disposed in a border portion of a partial display panel of each of the plurality of (partial) display apparatuses 1310 (S1420), and may provide the plurality of partial final image data PRGBout to the plurality of (partial) display apparatuses 1310, respectively (S1435). Each (partial) display apparatus 1310 may display an image based on corresponding partial final image data PRGBout provided from the host processor 1350 (S1470). In some exemplary embodiments, as described above with reference to FIGS. 11 through 14, the host processor 1350 may divide the border portion of the partial display panel of each of the plurality of (partial) display apparatuses 1310 into the four edge regions and the four corner regions, and may generate the plurality of partial final image data PRGBout by respectively compensating the plurality of partial input image data PRGB such that luminances of the edge regions are increased by a first multiplicative factor and luminances of the corner regions are increased by a second multiplicative factor greater than the first multiplicative factor. To store edge compensation constants and corner compensation constants of each of the plurality of (partial) display apparatuses 1310, the host processor 1350 may include a compensation constant storage 250, which includes an edge compensation constant storage 260 implemented with a one-dimensional lookup table and a corner compensation constant storage 270 implemented with a two-dimensional lookup table as illustrated in FIG. 11. In exemplary embodiments, the compensation constant storage 250 may be disposed inside or outside the host processor 1350. Thus, not only the luminance decrease of the border portion of each (partial) display apparatus 1310 compared with the center portion of each (partial) display apparatus 1310, but also the luminance decrease of the corner regions of each (partial) display apparatus 1310 compared with the edge regions of each (partial) display apparatus 1310 may be compensated. Accordingly, the image quality of the display system 1300 may be further improved.

In exemplary embodiments, the display system 1300 may be the tiled-display apparatus including the plurality of (partial) display apparatuses 1310. The inventions may be applied to any (partial) display apparatus 1310 or any electronic device that is the display system 1300. In an exemplary embodiment, the inventions may be applied to a digital television ("TV"), a three dimensional ("3D") TV, a smart phone, a tablet computer, a mobile phone, a personal computer ("PC"), a home appliance, a laptop computer, etc., for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display apparatus comprising:
   a display panel including a plurality of pixels; and
   a driver which receives input image data, divides a border portion of the display panel into edge regions and corner regions, generates final image data by compensating the input image data such that luminances of the edge regions are increased by a first multiplicative factor and luminances of the corner regions are increased by a second multiplicative factor greater than the first multiplicative factor, and drives the display panel based on the final image data,
   wherein the luminances of the edge regions for each of the edge regions gradually increase along a first direction toward a bezel, and remain the same along the second direction perpendicular to the first direction relative to no compensation of the input image data, and
   wherein the luminances of the corner regions for each of the corner regions gradually increase along the first direction, and gradually increase along the second direction relative to no compensation of the input image data.

2. The display apparatus of claim 1, wherein the driver includes:
   a compensation constant storage which stores edge compensation constants for pixels disposed in the edge regions among the plurality of pixels, and corner compensation constants for pixels disposed in the corner regions among the plurality of pixels.

3. The display apparatus of claim 2, wherein the corner compensation constants are greater than the edge compensation constants.

4. The display apparatus of claim 2, wherein the edge compensation constants for each of the edge regions gradually increase along the first direction toward a bezel, and are constant along the second direction perpendicular to the first direction, and
   wherein the corner compensation constants for each of the corner regions gradually increase along the first direction, and gradually increase along the second direction.

5. The display apparatus of claim 2, wherein the compensation constant storage includes:

an edge compensation constant storage including a one-dimensional lookup table which stores the edge compensation constants gradually increasing along the first direction toward a bezel with respect to each of the edge regions; and a corner compensation constant storage including a two-dimensional lookup table which stores the corner compensation constants gradually increasing along the first direction and along the second direction perpendicular to the first direction with respect to each of the corner regions.

6. The display apparatus of claim 2, wherein the driver generates the final image data by compensating the input image data for the pixels disposed in the edge regions with the edge compensation constants and by compensating the input image data for the pixels disposed in the corner regions with the corner compensation constants.

7. The display apparatus of claim 6, wherein, with respect to a pixel in an edge region of the edge regions or a corner region of the corner regions among the pixels, the driver generates the final image data for the pixel by compensating the input image data for the pixel by an equation "RGBout=RGB*{(1+W)^(1/γ)}", where RGBout represents the final image data for the pixel, RGB represents the input image data for the pixel, W represents an edge compensation constant of the edge compensation constants with respect to the pixel in the edge region or a corner compensation constant of the corner compensation constants with respect to the pixel in the corner region, and γ represents a gamma value of the display apparatus.

8. The display apparatus of claim 6, wherein, with respect to a pixel in a center portion surrounded by the border portion of the display panel among the plurality of pixels, the driver generates the final image data for the pixel a same as the input image data for the pixel.

9. The display apparatus of claim 2, wherein each of the plurality of pixels includes a plurality of sub-pixels, and wherein an edge compensation constant of the edge compensation constants or a corner compensation constant of the corner compensation constants is commonly applied to sub-pixels of the plurality of sub-pixels, the sub-pixels being included in a pixel of the pixels in the edge regions or the corner regions.

10. The display apparatus of claim 2, wherein each of the plurality of pixels includes a plurality of sub-pixels, and wherein different edge compensation constants or different corner compensation constants are applied to sub-pixels of the plurality of sub-pixels, the sub-pixels being included in a pixel of the pixels in the edge regions or the corner regions.

11. The display apparatus of claim 2, wherein the edge compensation constants and the corner compensation constants are determined based on a target luminance which is constant with respect to the plurality of pixels and real luminances which are changed depending on positions of the plurality of pixels.

12. The display apparatus of claim 11, wherein an edge compensation constant of the edge compensation constants or a corner compensation constant of the corner compensation constants for a pixel in an edge region of the edge regions or a corner region of the corner regions among the pixels is determined by an equation "W=Lt/Lr−1", where W represents the edge compensation constant or the corner compensation constant for the pixel, Lt represents a target luminance of the pixel, and Lr represents a real luminance of the pixel.

13. The display apparatus of claim 1, wherein the display apparatus is attached to at least one other display apparatus, and wherein at least one of the edge regions is adjacent to a bezel between the display panel of the display apparatus and a display panel of the at least one other display apparatus.

14. The display apparatus of claim 1, wherein the display apparatus is detachably attached to at least one other display apparatus.

15. A display system comprising:

a plurality of partial display apparatuses arranged in a tile shape; and a host processor which divides source image data into a plurality of partial input image data respectively corresponding to the plurality of partial display apparatuses, and provides the plurality of partial input image data to the plurality of partial display apparatuses, respectively, wherein each of the plurality of partial display apparatuses comprises a partial display panel including a plurality of pixels, and a driver which receives corresponding partial input image data among the plurality of partial input image data, divides a border portion of the partial display panel into edge regions and corner regions, generates partial final image data by compensating the corresponding partial input image data such that luminances of the edge regions are increased by a first multiplicative factor and luminances of the corner regions are increased by a second multiplicative factor greater than the first multiplicative factor, and drives the partial display panel based on the partial final image data, and wherein the luminances of the edge regions for each of the edge regions rad dually increase along a first direction toward a bezel, and remain the same along the second direction perpendicular to the first direction relative to no compensation of the input image data, and wherein the luminances of the corner regions for each of the corner regions gradually increase along the first direction, and gradually increase along the second direction relative to no compensation of the input image data.

16. The display system of claim 15, wherein the driver includes a compensation constant storage which stores edge compensation constants for pixels disposed in the edge regions among the plurality of pixels, and corner compensation constants for pixels disposed in the corner regions among the plurality of pixels, and wherein the corner compensation constants are greater than the edge compensation constants.

17. The display system of claim 16, wherein the compensation constant storage includes:

an edge compensation constant storage including a one-dimensional lookup table which stores the edge compensation constants gradually increasing along the first direction toward a bezel with respect to each of the edge regions; and a corner compensation constant storage including a two-dimensional lookup table which stores the corner compensation constants gradually increasing along the first direction and along the second direction perpendicular to the first direction with respect to each of the corner regions.

18. A display system comprising:

a plurality of partial display apparatuses arranged in a tile shape; and a host processor which divides source image data into a plurality of partial input image data respectively corresponding to the plurality of partial display apparatuses, divides a border portion of a partial display panel of each of the plurality of partial display apparatuses into edge regions and corner regions, generates a plurality of partial final image data by respectively compensating the plurality of partial input image data such that luminances of the edge regions are increased by a first multiplicative factor and luminances of the corner regions are increased by a second multiplicative factor greater than the first multiplicative factor, and provides the plurality of partial final image data to the plurality of partial display apparatuses, respectively, wherein the luminances of the edge regions for each of the edge regions gradually increase along a first direction toward a bezel, and remain the same along the second direction perpendicular to the first direction relative to no compensation of the input image data, and wherein the luminances of the corner regions for each of the corner regions gradually increase along the first direction, and gradually increase along the second direction relative to no compensation of the input image data.

19. The display system of claim 18, wherein the host processor includes, with respect to each of the plurality of partial display apparatuses, a compensation constant storage which stores edge compensation constants for pixels disposed in the edge regions among a plurality of pixels of the each of the plurality of partial display apparatuses, and corner compensation constants for pixels disposed in the corner regions among the plurality of pixels, and wherein the corner compensation constants are greater than the edge compensation constants.

20. The display system of claim 19, wherein the compensation constant storage includes:

an edge compensation constant storage including a one-dimensional lookup table which stores the edge compensation constants gradually increasing along the first direction toward a bezel with respect to each of the edge regions; and a corner compensation constant storage including a two-dimensional lookup table which stores the corner compensation constants gradually increasing along the first direction and along the second direction perpendicular to the first direction with respect to each of the corner regions.

* * * * *